US008107769B2

(12) United States Patent
Shimizu

(10) Patent No.: US 8,107,769 B2
(45) Date of Patent: Jan. 31, 2012

(54) IMAGE SYNTHESIS DEVICE, IMAGE SYNTHESIS METHOD AND MEMORY MEDIUM STORAGE IMAGE SYNTHESIS PROGRAM

(75) Inventor: Hiroshi Shimizu, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 1069 days.

(21) Appl. No.: 12/005,251

(22) Filed: Dec. 26, 2007

(65) Prior Publication Data

US 2008/0159652 A1 Jul. 3, 2008

(30) Foreign Application Priority Data

Dec. 28, 2006 (JP) ................................. 2006-353575
Jan. 17, 2007 (JP) ................................. 2007-007543

(51) Int. Cl.
*G06K 9/26* (2006.01)
(52) U.S. Cl. ........................................ 382/284; 345/634
(58) Field of Classification Search .................. 382/284, 382/276; 345/629–641; 348/584–601
See application file for complete search history.

(56) References Cited

U.S. PATENT DOCUMENTS

| | | | | |
|---|---|---|---|---|
| 5,414,779 A | * | 5/1995 | Mitch | 382/199 |
| 5,880,778 A | * | 3/1999 | Akagi | 348/218.1 |
| 6,798,924 B2 | * | 9/2004 | Ejiri et al. | 382/284 |
| 6,834,128 B1 | * | 12/2004 | Altunbasak et al. | 382/284 |
| 6,996,294 B2 | * | 2/2006 | Zhang et al. | 382/284 |
| 7,076,116 B2 | * | 7/2006 | Horie | 382/284 |
| 7,324,137 B2 | * | 1/2008 | Akizuki et al. | 348/221.1 |
| 7,929,800 B2 | * | 4/2011 | Meadow et al. | 382/284 |
| 2003/0035482 A1 | * | 2/2003 | Klompenhouwer et al. | 375/240.16 |
| 2003/0076406 A1 | * | 4/2003 | Peleg et al. | 348/36 |
| 2003/0103683 A1 | * | 6/2003 | Horie | 382/284 |
| 2006/0120625 A1 | * | 6/2006 | Peleg et al. | 382/284 |
| 2006/0153447 A1 | * | 7/2006 | Ouchi | 382/173 |
| 2008/0253687 A1 | * | 10/2008 | Zhang et al. | 382/284 |
| 2010/0296140 A1 | * | 11/2010 | Zahnert et al. | 358/505 |

FOREIGN PATENT DOCUMENTS

JP  11-282100 A  10/1999
JP  2007-318490 A  12/2007

OTHER PUBLICATIONS

Japanese Office Action dated Jun. 14, 2011 (and English translation thereof) in counterpart Japanese Application No. 2007-007543.

* cited by examiner

*Primary Examiner* — Bhavesh Mehta
*Assistant Examiner* — Sean Motsinger
(74) *Attorney, Agent, or Firm* — Holtz, Holtz, Goodman & Chick, PC

(57) ABSTRACT

An image synthesis device selects frame images in an order stored in a DRAM, and calculates the characteristic amount of the selected frame image. The image synthesis device searches a block having the calculated characteristic amount in a next frame, and calculates a moving vector. The image synthesis device sets an extraction width which is a width of a partial image to be extracted based on the calculated moving vector, and extracts an image at the extraction width from the central line in a current frame image. The image synthesis device combines and synthesizes the extracted partial image with the end portion, opposite to the moving vector, of a panorama synthetic image synthesized at this point, i.e., the end portion of the moving direction of an electronic camera.

25 Claims, 17 Drawing Sheets

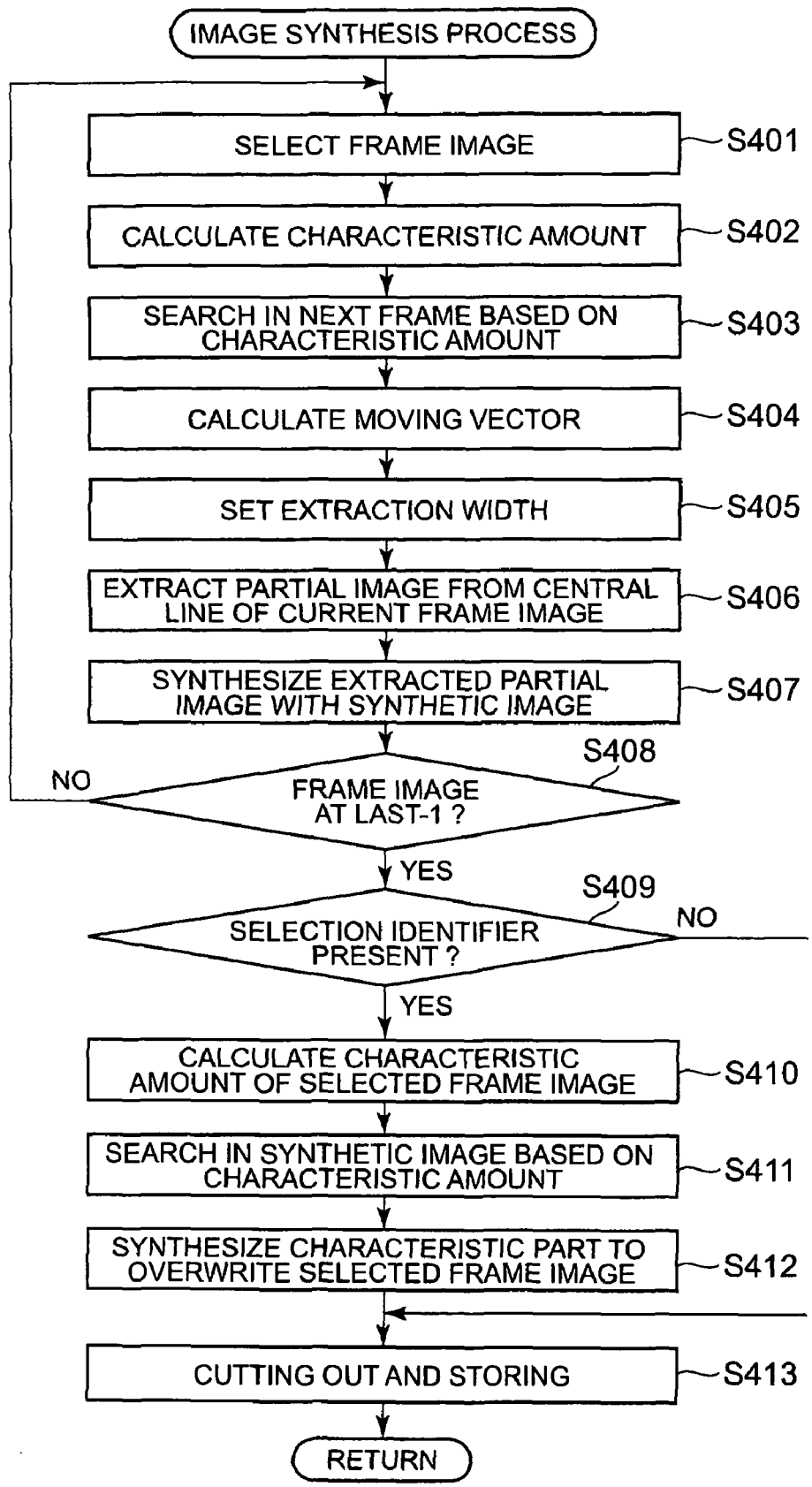

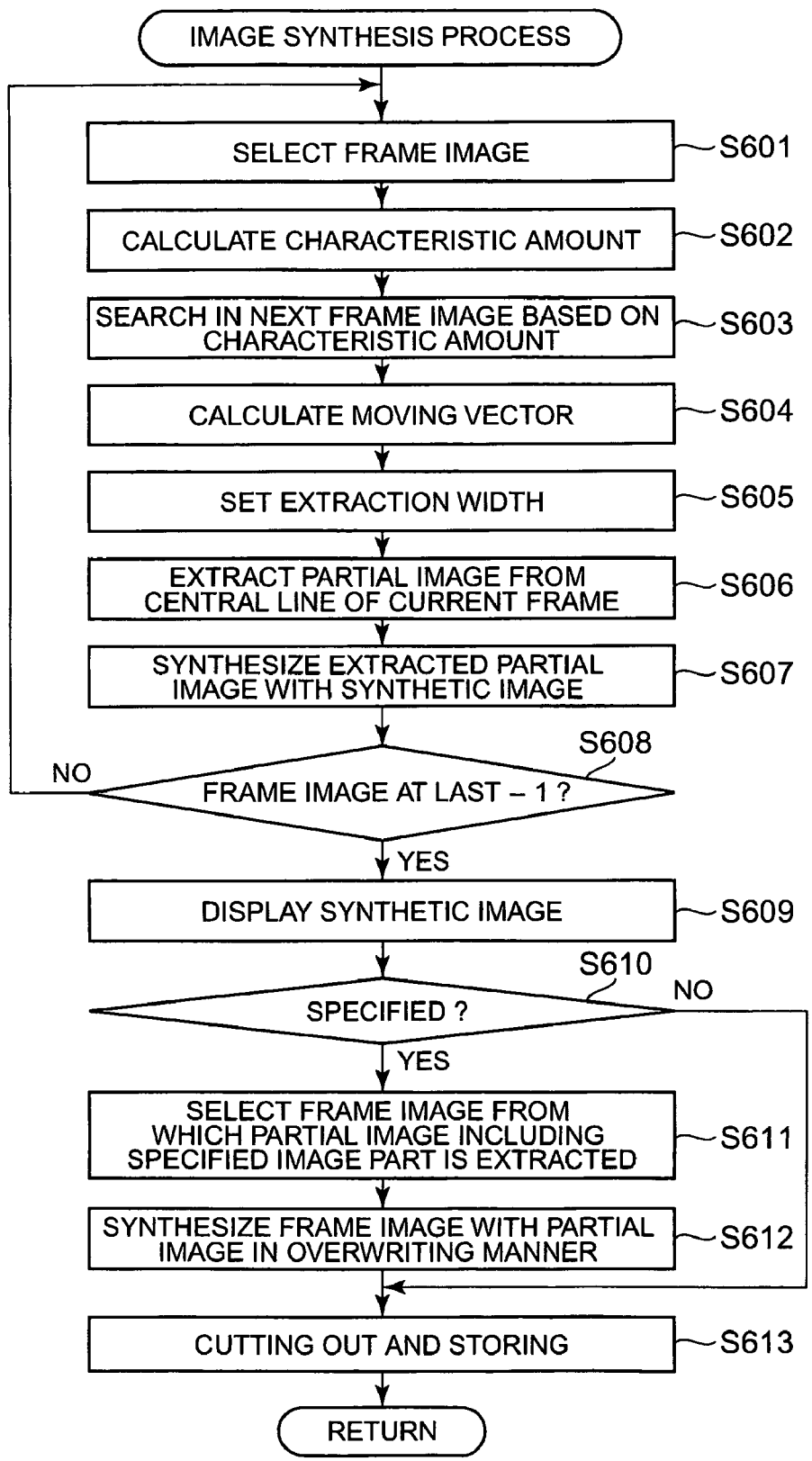

IMAGE SYNTHESIS DEVICE, IMAGE SYNTHESIS METHOD AND MEMORY MEDIUM STORAGE IMAGE SYNTHESIS PROGRAM

BACKGROUND OF THE INVENTION

1. Field of the Invention

The present invention relates to an image synthesis device and an image synthesis method which combine a plurality of frame images successively acquired by image pickup to create a synthesized panorama image, and a memory medium storing an image synthesis program for same.

2. Description of the Related Art

As disclosed in Unexamined Japanese Patent Application KOKAI Publication No. H11-282100, there is presently proposed an image pickup device which combines individual images of a plurality of picked-up frames and synthesizes a panorama image to obtain an angle of view which is greater than or equal to that acquired through one picked-up frame.

In synthesizing a panorama image, an image pickup device extracts a characteristic point adjacent to the central part of a picked-up image, detects the coordinates thereof, detects the coordinates of the same characteristic point in an image picked up next, and combines and synthesizes the successive images in such a way that the characteristic points match with each other to obtain a panorama image.

In this way, according to the conventional image pickup device, it is determined whether or not one frame image can be accurately synthesized with the other successive frame image based on whether or not there is a characteristic point adjacent to the central part of the one frame image.

SUMMARY OF THE INVENTION

It is an object of the invention to provide an image synthesis device and an image synthesis method which precisely combine picked-up images to synthesize a panorama image, and a memory medium storing an image synthesis program for same.

To achieve the object, an image synthesis device according to the first aspect of the invention comprises:

an image acquisition unit which performs image pickup to successively acquire a plurality of frame images;

a characteristic amount calculation unit which calculates a characteristic amount for each of plural image areas on one frame image acquired by the image acquisition unit;

an image area extraction unit which extracts an image area having a characteristic amount that is calculated by the characteristic amount calculation unit and is larger than or equal to a predetermined value;

an image area searching unit which searches an image area from an other frame image acquired by the image acquisition unit before or after the one frame image based on the characteristic amount of that image area extracted by the image area extraction unit;

a moving vector calculation unit which calculates a moving vector in the one frame image and the other frame image based on the image area searched by the image area searching unit and the image area extracted by the image area extraction unit;

a cutout width setting unit which sets a cutout width that is a distance between a predetermined reference line and an estimated line image in the one frame image based on the moving vector calculated by the moving vector calculation unit, the estimated line being a line on the one frame image corresponding to the predetermined reference line in the other frame;

an image cutout unit which cuts out a partial image, which has the cutout width in an opposite direction of the moving vector from the predetermined reference line, from the one frame image, or cuts out a partial image, which has the cutout width in a direction of the moving vector from the predetermined reference line, from the other frame image; and an image synthesis unit which causes the characteristic amount calculation unit, the image area extraction unit, the image area searching unit, the moving vector calculation unit, the cutout width setting unit, and the image cutout unit to process the plurality of frame images successively acquired by the image acquisition unit to acquire a plurality of partial images, and successively combines and synthesis the plurality of acquired partial images in a manner that reference lines correspond to respective estimated lines.

An image synthesis method according to the second aspect of the invention comprises:

an image acquisition step of performing image pickup to successively acquire a plurality of frame images;

a characteristic amount calculation step of calculating a characteristic amount for each of plural image areas on one frame image acquired in the image acquisition step;

an image area extraction step of extracting an image area having a characteristic amount that is calculated in the characteristic amount calculation step and is larger than or equal to a predetermined value;

an image area searching step of searching an image area from an other frame image acquired in the image acquisition step before or after the one frame image based on the characteristic amount of that image area extracted in the image area extraction step;

a moving vector calculation step of calculating a moving vector in the one frame image and the other frame image based on the image area searched in the image area searching step and the image area extracted in the image area extraction step;

a cutout width setting step of setting a cutout width that is a distance between a predetermined reference line and an estimated line image in the one frame image based on the moving vector calculated in the moving vector calculation step, the estimated line being a line on the one frame image corresponding to the predetermined reference line in the other frame;

an image cutout step of cutting out a partial image, which has the cutout width in an opposite direction of the moving vector from the predetermined reference line, from the one frame image, or cutting out a partial image, which has the cutout width in a direction of the moving vector from the predetermined reference line, from the other frame image; and an image synthesis step of causing the characteristic amount calculation step, the image area extraction step, the image area searching step, the moving vector calculation step, the cutout width setting step, and the image cutout step to process the plurality of frame images successively acquired in the image acquisition step to acquire a plurality of partial images, and successively combining and synthesizing the plurality of acquired partial images in a manner that reference lines correspond to respective estimated lines.

A memory medium according to the third aspect of the invention stores an image synthesis program which allows a computer having an image acquisition unit that performs image pickup to successively acquire a plurality of frame images to function as;

a characteristic amount calculation unit which calculates a characteristic amount for each of plural image areas on one frame image acquired by the image acquisition unit;

an image area extraction unit which extracts an image area having a characteristic amount that is calculated by the characteristic amount calculation unit and is larger than or equal to a predetermined value;

an image area searching unit which searches an image area from an other frame image acquired by the image acquisition unit before or after the one frame image based on the characteristic amount of that image area extracted by the image area extraction unit;

a moving vector calculation unit which calculates a moving vector in the one frame image and the other frame image based on the image area searched by the image area searching unit and the image area extracted by the image area extraction unit;

a cutout width setting unit which sets a cutout width that is a distance between a predetermined reference line and an estimated line in the one frame image based on the moving vector calculated by the moving vector calculation unit, the estimated line being a line on the one frame image corresponding to the predetermined reference line in the other frame image;

an image cutout unit which cuts out a partial image, which has the cutout width in an opposite direction of the moving vector from the predetermined reference line, from the one frame image, or cuts out a partial image, which has the cutout width in a direction of the moving vector from the predetermined reference line, from the other frame image; and an image synthesis unit which causes the characteristic amount calculation unit, the image area extraction unit, the image area searching unit, the moving vector calculation unit, the cutout width setting unit, and the image cutout unit to process the plurality of frame images successively acquired by the image acquisition unit to acquire a plurality of partial images, and successively combines and synthesis the plurality of acquired partial images in a manner that reference lines correspond to respective estimated lines.

BRIEF DESCRIPTION OF THE DRAWINGS

These object and other objects and advantages of the present invention will become more apparent upon reading the following detailed description and referring the accompanying drawings in which:

FIG. 13 is a flowchart showing the procedure of an image synthesis process according to the third embodiment of the invention;

FIG. 17 is a flowchart showing the procedure of an image synthesis process according to the sixth embodiment of the invention.

DETAILED DESCRIPTION OF THE PREFERRED EMBODIMENTS

Hereinafter, individual embodiments of the invention will be explained with reference to the accompanying drawings.

First Embodiment

Figure 1:
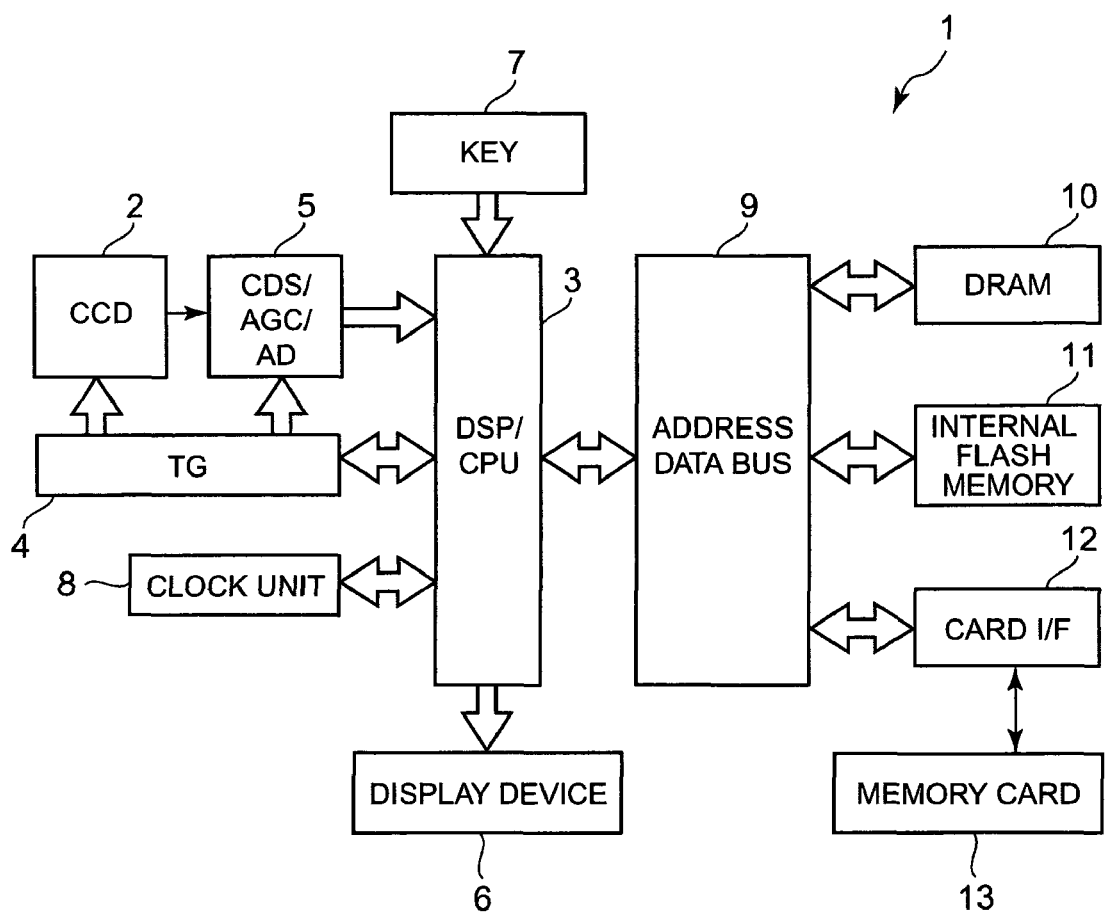
FIG. 1 is a block diagram of an electronic camera according to an embodiment of the invention.

FIG. 1 is a block diagram showing the general structure of an electronic camera 1 common to the individual embodiments of the invention. The electronic camera 1 has, not only a function of picking up a frame image having a predetermined angle of view, but also a panorama image pickup function of synthesizing individual image parts of the plurality of frame images to synthesize a panorama image. The electronic camera 1 has a CCD 2 disposed on an optical axis of a non-illustrated optical system, and a DSP/CPU 3. The DSP/CPU 3 is a one-chip microcomputer which has various digital signal processing functions including compression and expansion of image data in the JPEG format, and controls the components of the electronic camera 1. The DSP/CPU 3 is connected to a TG (Timing Generator) 4 which drives the CCD 2. The TG 4 is connected to a unit circuit 5 which accepts input of an analog image pickup signal according to the optical image of an object output from the CCD 2. The unit circuit 5 comprises an CDS holding an input image pickup signal, a gain adjusting amplifier (AGC) amplifying the image pickup signal, and an A/D converter (AD) converting the amplified image pickup signal into a digital image pickup signal. An output signal of the CCD 2 is transmitted as a digital signal to the DSP/CPU 3 through the unit circuit 5.

Further, the DSP/CPU 3 is connected to a display device 6, a key input unit 7, and a clock unit 8, and is connected to a DRAM 10, an internal flash memory 11, and a card interface 12 via an address data bus 9. A memory card 13 removably loaded in the non-illustrated card slot of the camera body is connected to the card interface 12.

The DRAM 10 is a buffer which temporarily saves the digitalized image data of an object picked up by the CCD 2 at a time when an image pickup standby mode is set, and is used as a working memory for the DSP/CPU 3. Image data temporarily saved in the DRAM 10 is compressed, and is eventually recorded in the memory card 13. The internal flash memory 11 stores an operation program for the DSP/CPU 3, and various data to be used in controlling the components of the electronic camera 1. The DSP/CPU 3 operates in accordance with the operation program, thereby functioning as the characteristic amount calculation unit, image area extraction unit, image area searching unit, moving vector calculation unit, cutout width setting unit, image cutout unit, and image synthesis unit of the invention.

The display device 6 includes a color LCD and a drive circuit thereof. The display device 6 displays an object image picked up by the CCD 2 as a through image in an image pickup standby state, and displays a recorded image read out from the memory card 13 and expanded in reproducing the recorded image. The key input unit 7 includes a plurality of operation keys, such as a shutter key, a power key, a mode selection key, and a set of arrow keys. The key input unit 7 outputs a key input signal according to a key operation of a user to the DSP/CPU 3. The clock unit 8 has a calendar function and a clock function of counting a date and a time. The clock unit 8 sends date data and time data to the DSP/CPU 3 in accordance with necessity in an image pickup operation.

Figure 2:
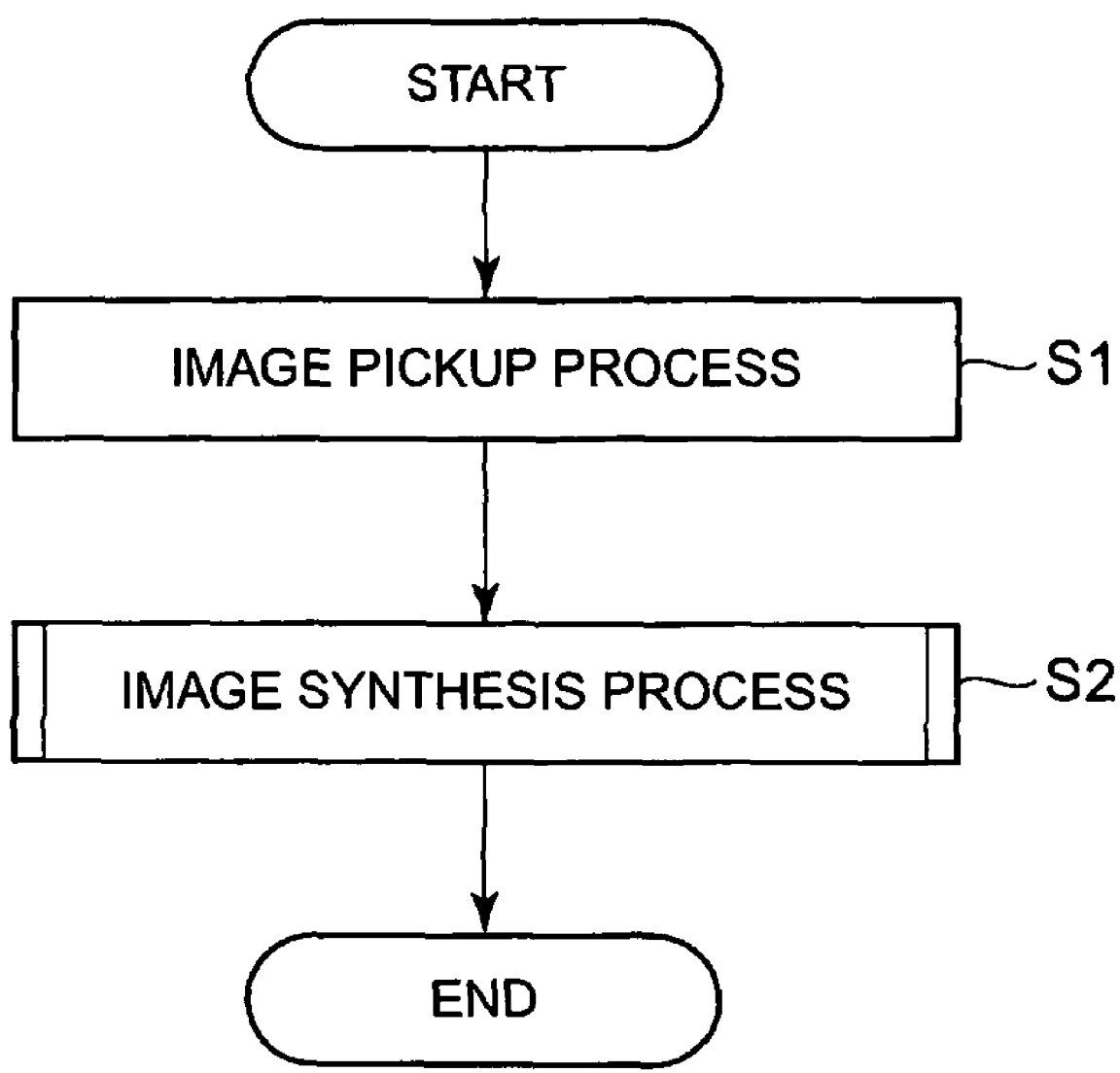
FIG. 2 is a general flowchart common to first to sixth embodiments of the invention.

In the electronic camera 1 having the foregoing structure, the DSP/CPU 3 executes a process represented by the flowchart of FIG. 2 in accordance with the foregoing program. That is, as the user operates the mode selection key of the key input unit 7 and selects a panorama image pickup mode, the DSP/CPU 3 executes an image pickup process (step S1), and executes an image synthesis process (step S2).

Figure 3:
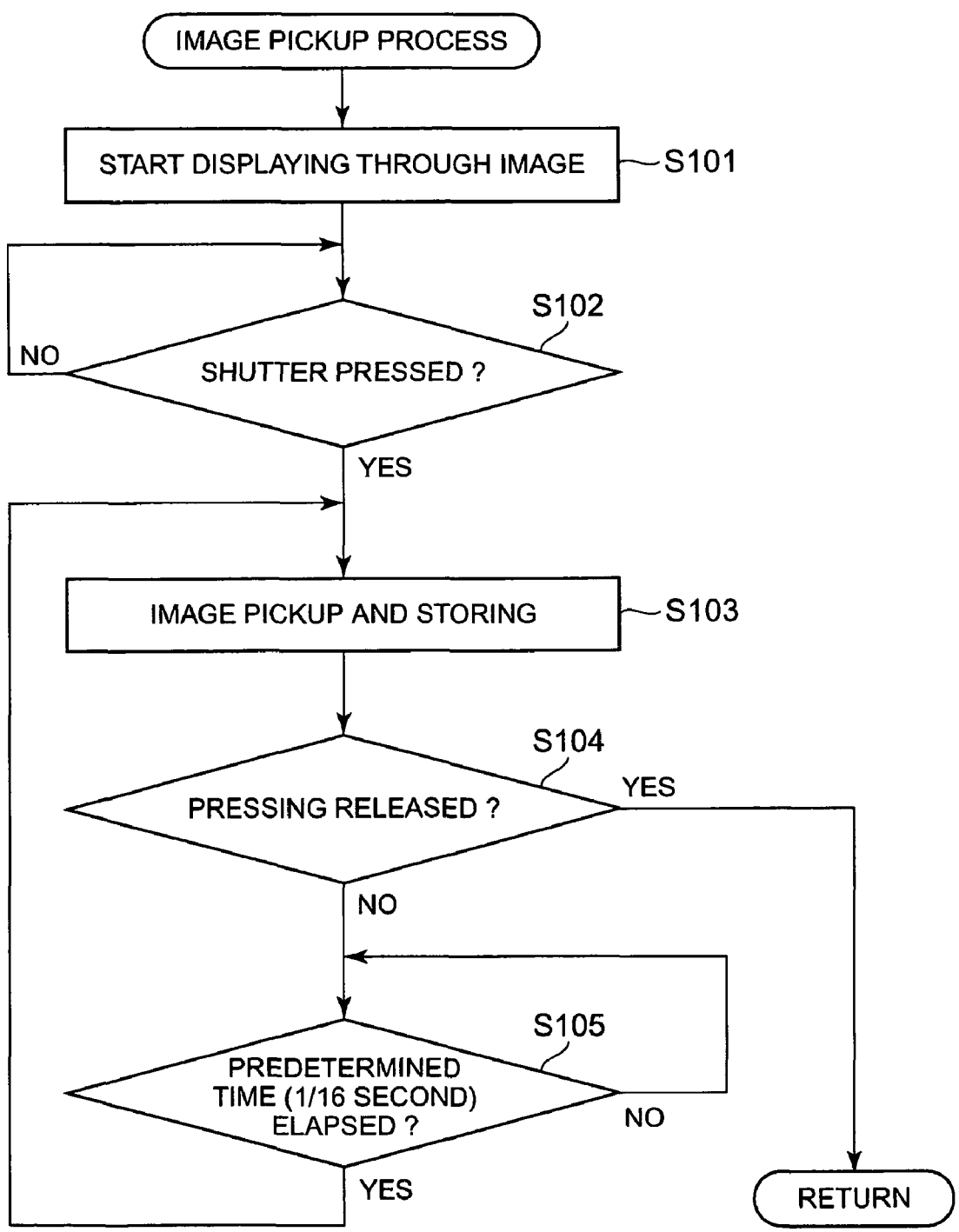
FIG. 3 is a flowchart showing the procedure of an image pickup process in the first, second, fifth and sixth embodiments of the invention.

FIG. 3 is a flowchart showing the procedure of the image pickup process (in the step S1). First, the DSP/CPU 3 starts displaying a through image (step S101). A through image is displayed on the display device 6 through the process in the step S101. Next, the DSP/CPU 3 determines whether or not the shutter key is pressed (step S102). When determining that the shutter key is pressed (step S102: YES), the DSP/CPU 3 executes an image-pickup and recording process to capture a frame image from the CCD 2 and to save the frame image in the DRAM 10 (step S103).

Next, the DSP/CPU 3 determines whether or not the shutter key is released (step S104). When determining that the shutter key is not released (step S104: NO), the DSP/CPU 3 determines whether or not a predetermined time (1/16 second in the embodiment) elapsed (step S105). When the predetermined time elapsed (step S105: YES), the DSP/CPU 3 repeats the process from the step S103. Therefore, in a state where the shutter key is not released (step S104: NO), the DSP/CPU 3 repeats the process from the step S105 at a predetermined time (1/16 second) interval.

Therefore, when the user keeps pressing the shutter key without repeatedly operate the shutter key, a plurality of frame images having a frame rate equal to the predetermined time are to be stored in the DRAM 10.

When determining that the user releases the pressing shutter key (step S104: YES), the DSP/CPU 3 returns the process to the general flow in FIG. 2. Therefore, a plurality of frame images, picked up at the predetermined time (1/16 second) interval from when the user pressed the shutter key and to when the user released the shutter key, are stored in the DRAM 10. At this time, let us suppose that the user moves the electronic camera 1 in parallel to do panorama image pickup in a desired direction, e.g., a right direction, and performs image pickup. Or, let us suppose that the user performs image pickup while rotating the direction at which the electronic camera 1 picks up an image in a right direction. In this case, a plurality of frame images having an object moved in a direction opposite to the moving or rotating direction of the electronic camera 1 are stored in the DRAM 10.

Figure 4:
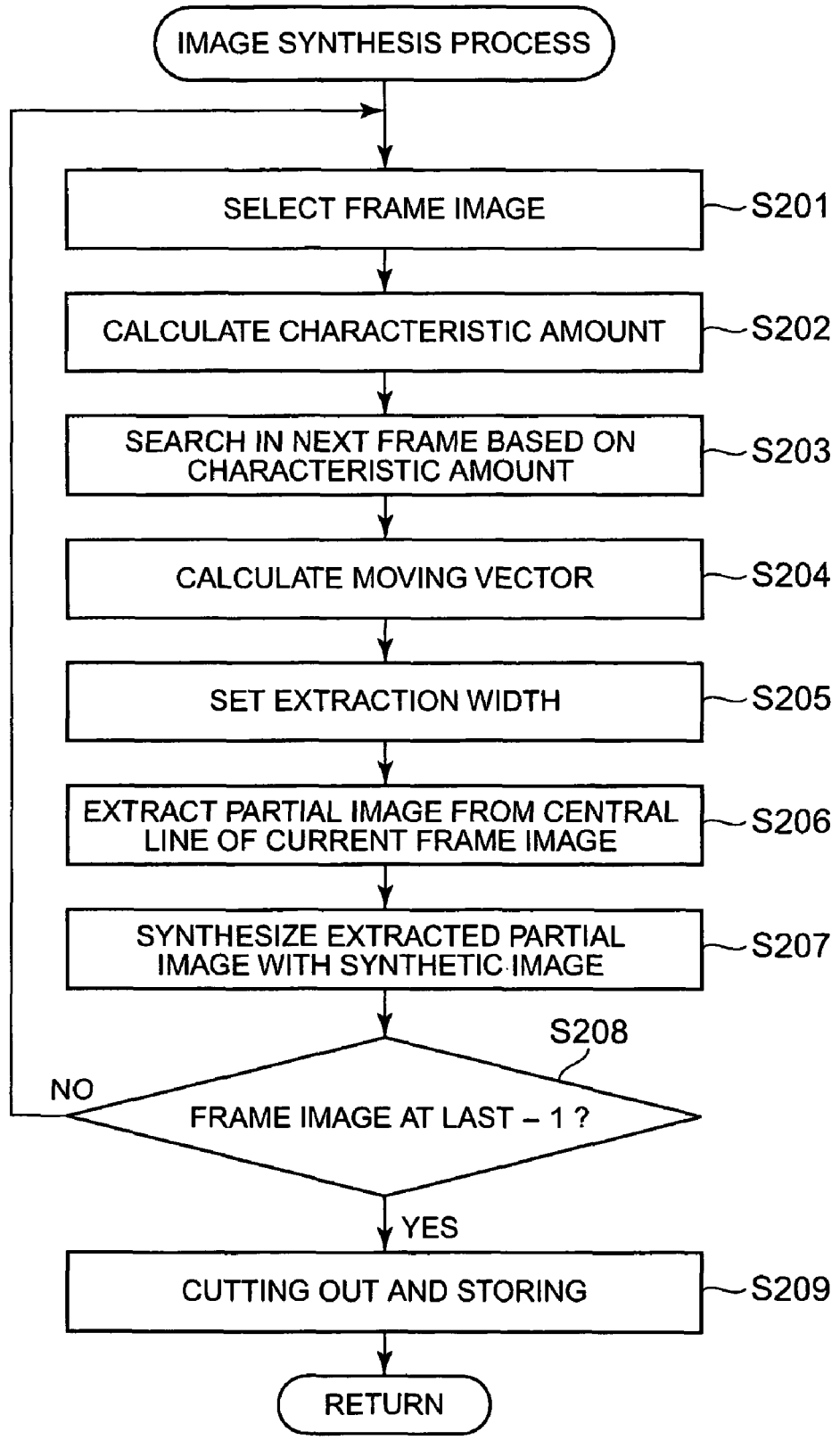
FIG. 4 is a flowchart showing the procedure of an image synthesis process in the first embodiment.

FIG. 4 is a flowchart showing the procedure of the image synthesis process (in the step S2). Note that an explanation will be given of a case where the image synthesis process is performed on a plurality of frame images obtained by moving the electronic camera 1 in parallel in a right direction. That is, an explanation will be given of a case where the image synthesis process is performed on a plurality of frame images having an object image looked like as if it is moving to left over time between the individual frame images.

First, the DSP/CPU 3 selects the frame images from the DRAM 10 in a stored order (step S201). That is, the frame images are selected in an order that the frame images are picked up.

Figure 5A:
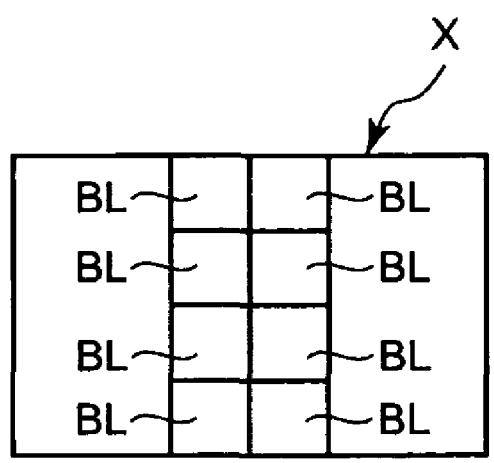
FIGS. 5A and 5B are explanatory diagrams showing a calculation procedure for a moving vector.

Next, the DSP/CPU 3 calculates the characteristic amount of the selected frame image (step S202). In calculating the characteristic amount, as shown in FIG. 5A, a plurality of blocks BL set near the center (central area) of a current frame image X selected in the step S201 are taken as remarked images. The respective characteristic amounts in the plurality of blocks BL are calculated, and a block BL having a characteristic amount greater than or equal to a predetermined value is then extracted. HARRIS operator is used as an operational expression in calculating the characteristic amount.

Next, the DSP/CPU 3 searches a block BL having a characteristic amount common to each block BL having a calculated characteristic amount greater than or equal to the predetermined value, in a next frame (after frame) image X+1 (step S203). The next frame (after frame) image X+1 is a frame image stored (picked up) next to the current frame image X.

The DSP/CPU 3 detects a moving vector (X-axis component and Y-axis component) for each block BL having the common characteristic amount in the current frame image X and the next frame image X+1. The DSP/CPU 3 calculates, for example, an average value of the individual detected moving vectors, thereby calculating the moving vector of whole frames (step S204). That is, a moving vector of the object image from the current frame image X to the next frame image X+1 is calculated.

Next, the DSP/CPU 3 sets an extraction width which is a width of a partial image to be extracted (step S205). Setting of the extraction width is carried out by extracting a preset moving direction component from the moving vector of the whole frames, and reading out the width from a conversion table 112 prestored in the internal flash memory 11 and shown in FIG. 6C based on the extracted moving direction component.

Note that the conversion table 112 sets an extraction width based on the moving direction component in such a way that a line apart from the central line of the current frame X in the moving direction of the electronic camera 1 (right direction in the embodiment) by the extraction width corresponds to the central line of the next frame image X+1.

In the case of the embodiment, it is supposed that a panorama synthetic image in the horizontal direction is to be created, and a horizontal direction component (X-axis component), i.e., the moving amount of the object image in the left direction is extracted from the moving vector of the whole frames, and an extraction width W corresponding to the moving amount is then read out.

Figures 6A, 6B, 6C:
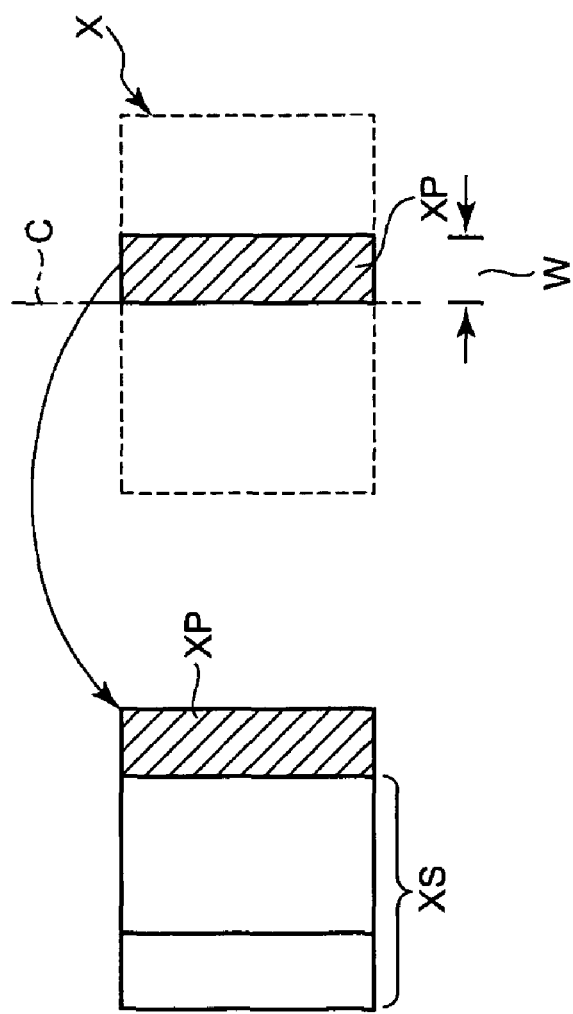
FIGS. 6A to 6C are explanatory diagrams showing a process of extracting a partial image synthesized from a current frame image and the procedure of the synthesis process.

Subsequently, the DSP/CPU 3 extracts an image from the current frame image X at the extraction width with a predetermined central line of the current frame image X taken as a reference (step S206). That is, as shown in FIG. 6B, first, a central line C which is a straight line passing through the central point of the frame and running in a direction (Y-axis direction in the embodiment) orthogonal to the extracted moving direction component is set over the current frame X. A partial image XP of the image is extracted by the extraction width W in the moving direction of the electronic camera 1 (right direction in the embodiment) that is an opposite direction of the moving vector from the central line C in the current frame image X. That is, in extracting a partial image from the current frame image X, a partial image XP is extracted in a direction opposite to the moving vector (moving direction of the electronic camera 1) with the central line C taken as the reference.

Thereafter, the DSP/CPU 3 combines and synthesizes the extracted partial image XP with the rear end portion, which is in a direction opposite to the moving vector, of a panorama synthetic image XS that has been synthesized at present time, i.e., the rear end portion in the moving direction of the electronic camera 1 (right side in the embodiment) as shown in FIG. 6A (step S207).

Subsequently, the DSP/CPU 3 determines whether or not the process (step S201 to step S207) relating to a partial-image synthesizing is performed on up to a frame image which is the second frame from the last stored in the DRAM 10 (step S208). That is, the DSP/CPU 3 repeats the process from the step S201 to the step S207 until the process is performed on the second frame image from the last.

By performing such a panorama-image synthesizing, a partial image having no distortion at the central part of an image imaged by the optical system is extracted and synthesized without extracting both side parts having distortions. This results in a panorama synthetic image XS having no distortion entirely.

When extraction is performed for individual frame images by an extraction width according to the magnitude of a moving vector from the same reference central line C, images at the end edge of the extracted image from the previous frame image and at the end edge of the extracted image from the next frame image can precisely match with each other between frame images successive in time. Therefore, images picked up successively in time are precisely combined to synthesize a panorama image.

Note that in image synthesizing at the step S207, alignment in the vertical direction when the end portion of the partial image XP is combined and synthesized with the panorama synthetic image XE is carried out by moving and adjusting the partial image XP in the vertical direction in accordance with the vertical direction component of the moving vector. Therefore, in a case where the user moves the electronic camera 1 in a right direction even while holding it, a vibration in the vertical direction is unavoidably applied to the electronic camera 1, so that the panorama synthetic image XE becomes a combined image having partial images shifted in the vertical direction as shown in FIG. 7.

When determining that the process from the step S201 to the step S207 is performed on the second frame image from the last (step S208: YES), the DSP/CPU 3 executes a cutout and storing process (step S209). In the cutout and storing process, as shown in FIG. 7, an image part having a predetermined width is cut out from the panorama synthetic image combined and synthesized by the last process in the step S207 along the combining direction, and the cutout image part is recorded as a final panorama synthetic image XE in the memory card 13.

Figure 7:
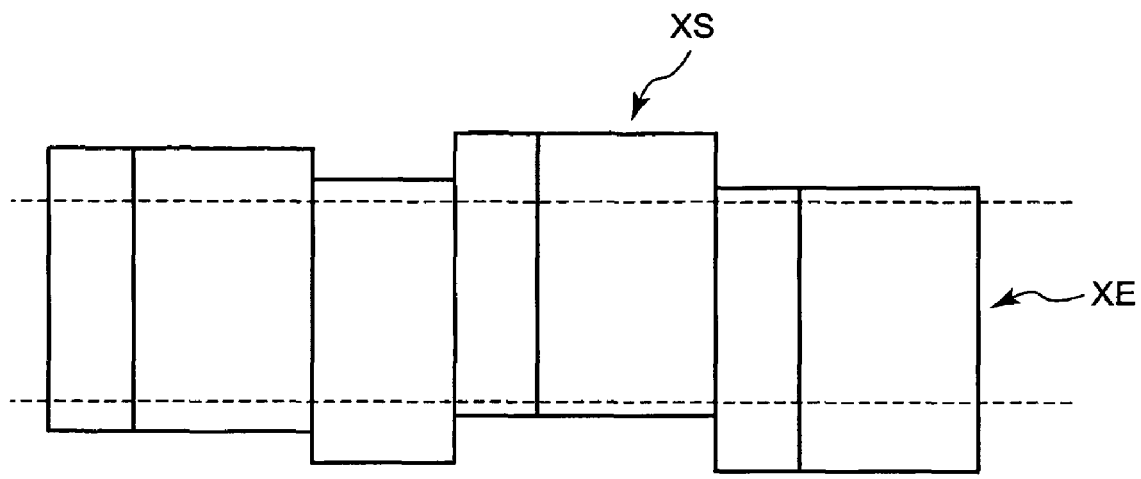
FIG. 7 is an explanatory diagram showing a trimming area of a panorama synthetic image.

That is, as mentioned before, in a case where the user moves the electronic camera 1 in a right direction even while holding it, a vibration in the vertical direction is unavoidably applied to the electronic camera 1, and the panorama synthetic image XS becomes a combined image of the partial images shifted in the vertical direction as shown in FIG. 7. Therefore, an image part having a predetermined width along the combining direction is cut out, and the cutout image part is recorded as a final panorama synthetic image XE in the memory card 13, thereby recording and saving a panorama synthetic image XE having a flat periphery.

Although a partial image to be synthesized is extracted with the central line C passing through the central point of a frame taken as the reference in the embodiment, the reference line is not limited to the central line C, and may be a line located at a portion slightly shifted in the horizontal direction as long as it is located near the center. In particular, in a case where a direction at which the user moves the electronic camera 1 is set beforehand and a partial image is extracted within a current frame image based on a moving vector searched in a next frame using the characteristic amount in the current frame image, it is desirable that the reference line should be set beforehand at a position shifted in a direction opposite to the moving direction of the electronic camera 1. That is, in a case where a partial image is extracted from a current frame image, a partial image XP is extracted in a direction opposite to the moving vector (moving direction of the electronic camera 1) with the central line C taken as the reference. Thus, when the reference line is set beforehand at a position shifted in the direction opposite to the moving direction of the electronic camera 1, a partial image including the central area of the frame image can be extracted. Note that the direction at which the user moves the electronic camera 1 may be preset arbitrarily through the key input unit 7.

Although a partial image to be synthesized is extracted from a current frame image X in the embodiment, it may be extracted from a next frame image X+1 at the foregoing extraction width. In a case where a partial image is extracted from the next frame image X+1 at the foregoing extraction width, an image is extracted from the next frame image X+1 with a predetermined central line of the next frame image X+1 taken as the reference by the foregoing extraction width, and at this time, a partial image XP of an image corresponding to the foregoing extraction width W is extracted in a direction (left in this case) opposite to the moving direction of the electronic camera 1, i.e., the direction of the moving vector from the central line C in the next frame image X+1. In particular, in a case where a direction at which the user moves the electronic camera 1 is set beforehand, it is preferable that the reference line should be set beforehand at a position shifted in the moving direction of the electronic camera 1. That is, in a case where a partial image is extracted from a next frame image, a partial image XP is extracted in the direction of the moving vector (direction opposite to the moving direction of the electronic camera 1) with the central line C taken as the reference, so that when the reference line is set beforehand at a position shifted in the moving direction of the electronic camera 1, a partial image including the central area of the frame image can be extracted. Note that the direction at which the user moves the electronic camera 1 may be preset arbitrarily through the key input unit 7.

Second Embodiment

According to the second embodiment, a priority order is set for each area in a frame image, and a characteristic amount is extracted giving a preference of an area having a higher priority. Accordingly, an image area of a portion of an image having no distortion and imaged by the optical system can be used as a preferential area for characteristic amount calculation. This enables appropriate calculation of a characteristic amount.

Further, according to the second embodiment, a calculated characteristic amount and a partial image thereof are stored, and when no characteristic amount is calculated in any areas, a characteristic amount calculated at last is used to search a partial image having that characteristic amount in a next frame image, thereby calculating a moving vector. This allows calculation of a moving vector using a past characteristic amount even in a case where an object like a pole that calculation of a characteristic amount is difficult is included in a frame image.

The electronic camera 1 of the second embodiment has the same structure as that of the first embodiment. The electronic camera 1 of the second embodiment, however, stores a priority order table 111 in the internal flash memory 11.

Figure 8A:
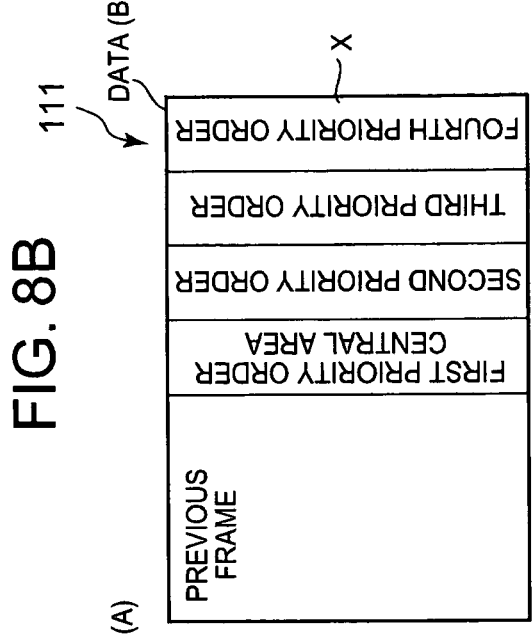
FIGS. 8A and 8B are explanatory diagrams showing the stored contents of a priority order table.
Figure 8B:
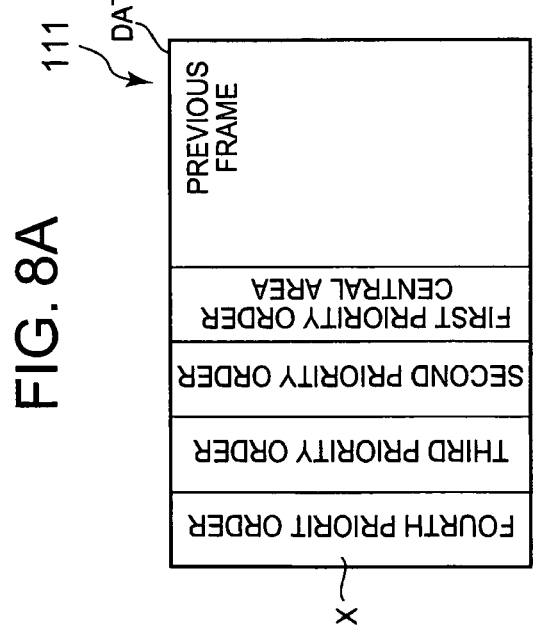

FIGS. 8A and 8B are diagrams showing the priority order table 111 stored in the internal flash memory 11 together with the above-described program in the second embodiment. In the case of the embodiment, let us suppose that a panorama synthetic image in the horizontal direction is to be created. The priority order table 111 comprises data A for panorama image pickup having a moving vector to be discussed later in a left direction (moving vector includes left direction component VL), and data B for panorama image pickup having a moving vector in a right direction (moving vector includes right direction component VR).

Figure 8C:
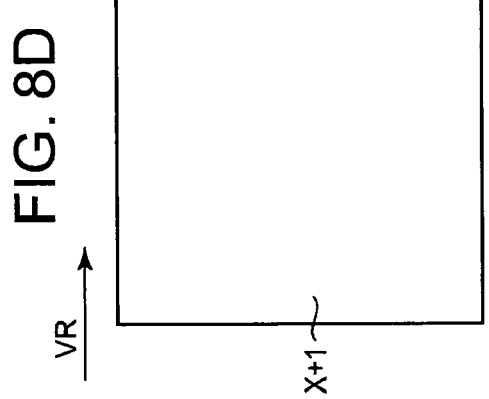
FIGS. 8C and 8D are diagrams for complementing the explanation with reference to FIGS. 8A and 8B.

As shown in FIG. 8A, stored in the data A are areas for extracting characteristic amounts (characteristic amount extraction areas) having first to fourth priority orders 1 in a current frame X selected this time in a case where an expected moving vector to be detected is in a left direction as shown in FIG. 8C, i.e., the moving direction of the electronic camera 1 is in a right direction. The first to fourth priority orders are set in such a way that a central area has the first priority order, and become small from the central area toward the left side, and an area having the fourth priority order has an image distortion imaged by the optical system, so that it is not desirable for characteristic amount extraction.

In the embodiment, as will be explained at step S302 to be discussed later, the utmost priority is given to the central area having the first priority, and a characteristic amount is extracted from the central area as much as possible. Therefore, an image area of a part of an image having no distortion and imaged by the optical system can be preferentially used for characteristic amount calculation, resulting in appropriate calculation of a characteristic amount.

Figure 8D:
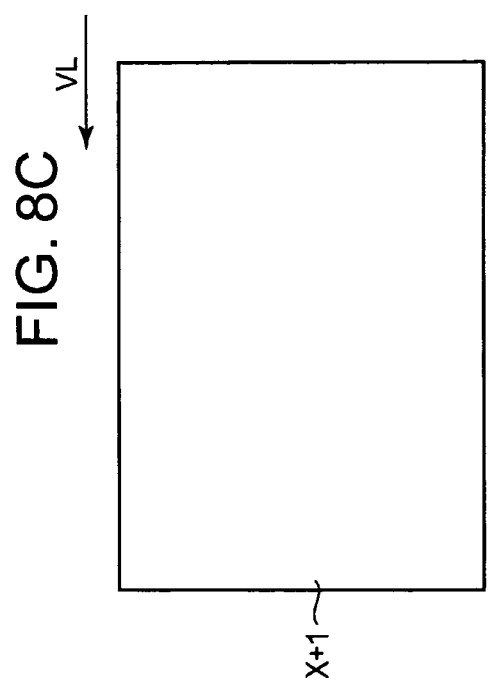

Moreover, as shown in FIG. 8B, stored in the data B are areas for extracting characteristic amounts (characteristic amount extraction areas) having first to fourth priority orders in a current frame X selected this time in a case where an expected moving vector to be detected is in a right direction as shown in FIG. 8D, i.e., the moving direction of the electronic camera 1 is in a left direction. The first to fourth priority orders are set in such a way that the central area has the first priority, and become small from the central area toward the right side. An area having the fourth priority order has an image distortion imaged by the optical system, so that it is not desirable for characteristic amount calculation.

Although only the pieces of data A, B are stored for a case where the moving vector is in a left direction or in a right direction in the embodiment, similar data may be stored for a case of an upward direction and a downward direction.

Likewise the first embodiment, the electronic camera 1 of the second embodiment executes a process represented by the flowchart of FIG. 2 in accordance with the operation program.

Likewise the first embodiment, the electronic camera 1 of the second embodiment executes an image pickup process represented by the flowchart of FIG. 3 in the step S1 in accordance with the operation program.

Figure 9:
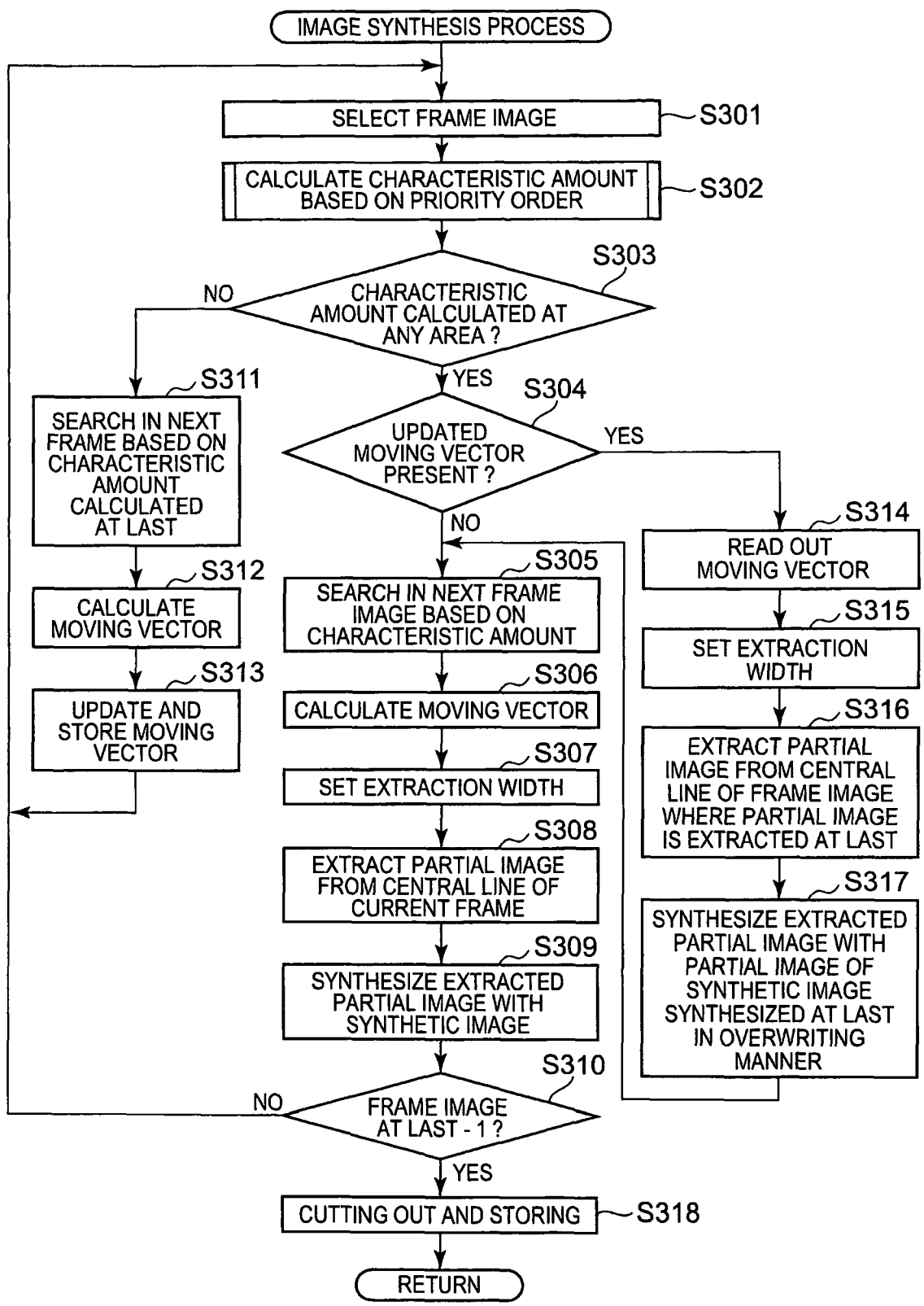
FIG. 9 is a flowchart showing the procedure of an image synthesis process according to the second embodiment of the invention.

FIG. 9 is a flowchart showing the procedure of the image synthesis process (step S2) in the second embodiment. Note that an explanation will be specifically given of a case where the moving direction of the electronic camera 1 is in a right direction in the horizontal direction.

First, the DSP/CPU 3 selects frame images from the DRAM 10 in a stored order (step S301). Next, the DSP/CPU 3 calculates characteristic amounts in the selected frame image in the foregoing priority order (step S302).

In the process at the step S302, a default value "1" is set to a counter N for setting down the priority order, and it is determined whether or not a characteristic amount can be calculated at a priority order Nth area in a previous frame. That is, when N=1, as shown in FIG. 8A, the first priority order area which is the central area in a current frame X is divided into a plurality of blocks BL like the process in the step S202. Respective characteristic amounts for the plurality of blocks BL are calculated, and based on the calculation results, it is determined whether or not a characteristic amount can be calculated (or, whether or not there is a block having a characteristic amount greater than or equal to a predetermined value).

At this time, in a case where an image of, for example, a white wide pole or wall is picked up in the first priority order area in the current frame X, no characteristic amount is calculated at any blocks BL in the first priority order area. Therefore, in this case, the value of the counter N is incremented, and the same process is performed on the second priority order area. In a case where no characteristic amount is calculated in any blocks BL in the second priority order area, the same process is performed on the third and fourth priority order areas.

Accordingly, even in a case where no characteristic amount is calculated in any blocks BL in the first priority order area, calculation of a characteristic amount can be performed using the other area.

Next, the DSP/CPU 3 determines whether or not a characteristic amount greater than or equal to a predetermined value is calculated at any areas of the first to fourth priority orders (step S303). When determining that the characteristic amount greater than or equal to the predetermined value is calculated (step S303: YES), the DSP/CPU 3 determines whether or not an updated moving vector to be discussed later is stored (step S304). When determining that no updated moving vector is stored (step S304: NO), the DSP/CPU 3 executes the same process from step S305 to step S310 as that from the step S203 to the step S208 in the first embodiment.

That is, the DSP/CPU 3 searches a block BL having the common characteristic amount to each block having a characteristic amount calculated in the step S302 and greater than or equal to the predetermined value in a next frame (after frame) image X+1 shown in FIG. 10(i) (step S305). That is, in FIG. 10(i), when the current frame image is "(1)" and the characteristic amount is "a", the characteristic amount "a" is searched in a frame image (2) in the next frame X+1 in FIG. 10(i).

The DSP/CPU 3 detects a moving vector (X-axis component, Y-axis component) for each corresponding block BL having the common characteristic amount a in the current frame image X (1) and the next frame image X+1 (2). Further, the DSP/CPU 3 calculates, for example, the average value of the detected moving vectors, thereby calculating a moving vector (A) of the whole frames (step S306).

Next, the DSP/CPU 3 sets an extraction width which is the width of a partial image to be extracted (step S307). Setting of the extraction width is carried out by extracting a moving direction component set beforehand from the moving vector of the whole frames, and reading out the width from the conversion table 112 stored beforehand in the flash memory 11 shown in FIG. 6C based on the extracted moving direction component.

The conversion table 112 sets an extraction width based on the moving vector component in such a way that a line apart from the central line in the current frame X in the moving direction (right direction in this case) of the electronic camera 1 by the extraction width corresponds to the central line in the next frame image X+1.

In the case of the embodiment, it is supposed that a panorama synthetic image in the horizontal direction is to be created, and the horizontal direction component (X-axis component) is extracted from the moving vector of the whole frames, i.e., the moving amount of the object image in the left direction is extracted, and an extraction width W corresponding to the moving amount is to be read out.

Figure 10:
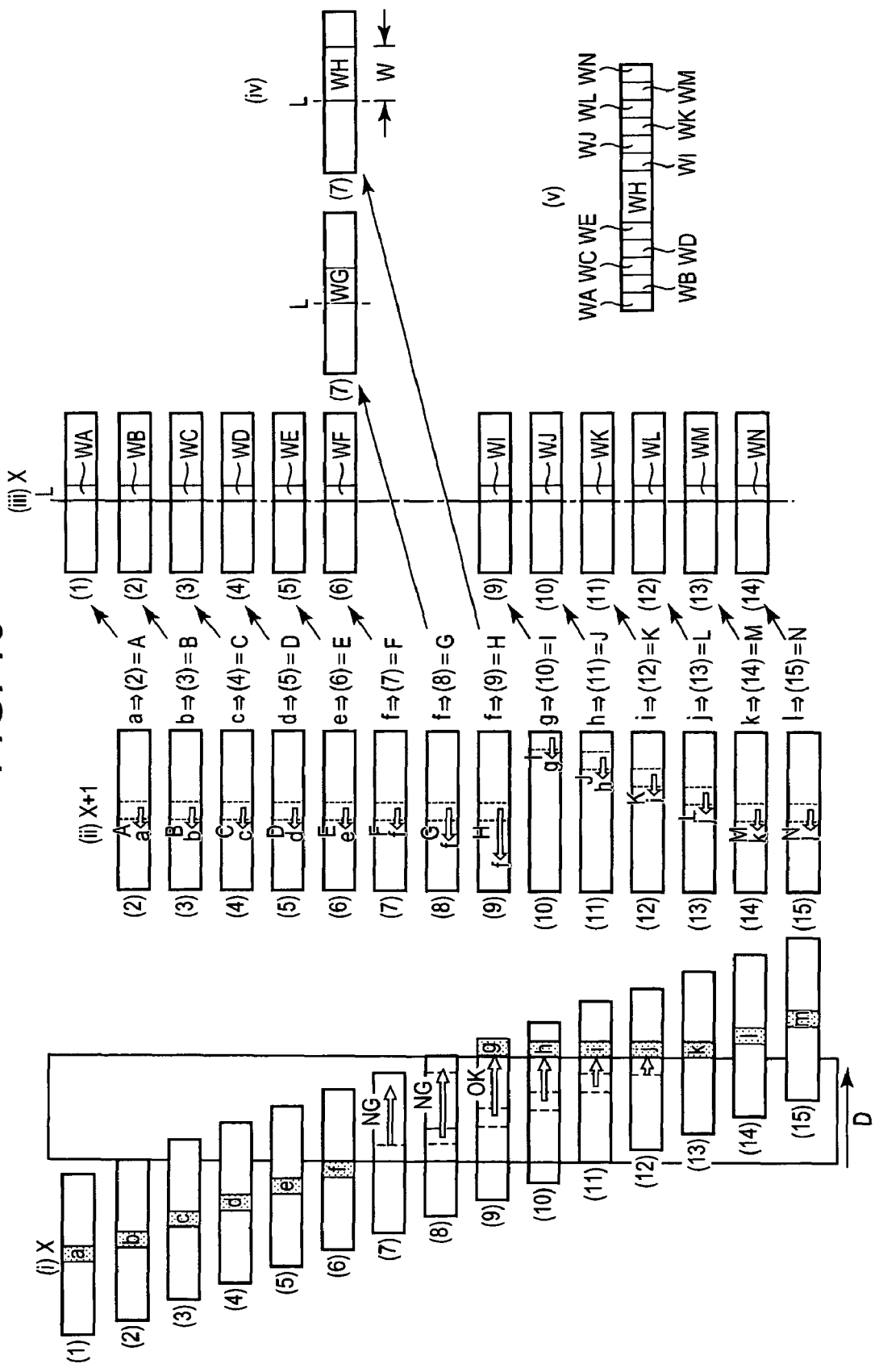
FIG. 10 is an explanatory diagram showing the procedure of the image synthesis process in the second embodiment of the invention.

Subsequently, the DSP/CPU 3 extracts an image from the current frame image X at the foregoing extraction width W with the predetermined central line of the current frame X taken as the reference (step S308). That is, as shown in FIG. 10(*iii*), first, a reference line L which is a straight line passing through near the center of the frame and running in a direction (Y-axis direction in this case) orthogonal to the extracted moving direction is set over the current frame X. A partial image XP of the image by the extraction width W is extracted in the moving direction D of the electronic camera 1 (right direction in this case) opposite to the moving vector from the reference line L in the current frame image X. That is, in a case where a partial image is extracted from the current frame image, the partial image XP is extracted in the direction (moving direction D of the electronic camera 1) opposite to the moving vector with the reference line L taken as the reference.

Thereafter, as shown in FIG. 6A, the DSP/CPU 3 combines and synthesizes the extracted partial image XP with the rear end portion of a panorama synthetic image synthesized up to this point in the opposite direction to the moving vector, i.e., the rear end portion (right side in the embodiment) of the moving direction D of the electronic camera 1 (step S309).

Subsequently, the DSP/CPU 3 determines whether or not the process is performed on up to a second frame image from the last stored in the DRAM 10 (step S310). The DSP/CPU 3 repeats the process from the step S301 to the step S310 until the process is performed on the second frame image from the last.

That is, as shown in FIG. 10(*i*), (1) to (6), in a case where an image of an object other than an "object not suitable for calculation of a characteristic amount" is picked up in any first to fourth priority order areas, the determination result in the step S303 becomes YES, and the determination result in the step S304 becomes NO. Therefore, the process from the step S301 to the step S310 is repeated, characteristic amounts a, b, c, d, e, and f are respectively searched in next frame images (2) to (7) in FIG. 10(*i*) corresponding to current frame images (1) to (6) through the process in the step S205, and moving vector A, B, C, D, E, and F are calculated through the process in the step S206.

Then, as shown in FIG. 10(*iii*), partial images WA, WB, WC, WD, WE, and WF are extracted at extraction widths corresponding to the respective moving vectors A, B, C, D, E, and F from the reference line L from the current frame images (1) to (6) through the process in the step S307 and the step S308. The partial images WA, WB, WC, WD, and WE are combined and synthesized together through the process in the step S309, and the partial image WF to be discussed later is combined and synthesized at this time.

However, like the current frame image (7) in FIG. 10(*i*), in a case where the image of the "object not suitable for calculation of a characteristic amount" is picked up in all first to fourth priority order areas, no characteristic amount greater than or equal to the predetermined value is calculated in any of the first to fourth priority order areas, and the determination result in the step S303 becomes NO. Therefore, the process progresses to step S311 from the step S303.

That is, when determining that no characteristic amount greater than or equal to the predetermined value is calculated (step S303: NO), the DSP/CPU 3 searches a block in the next frame image X+1 (frame image next to the current frame X selected at the step S301) based on a characteristic amount calculated at last (step S311).

That is, because the characteristic amount calculated at last is calculated from the frame image (6) in FIG. 10(*i*), a block is searched in a frame image (8) which is the next frame image X+1 based on a characteristic amount f of the frame image (6). Then, likewise the step S306, the moving vector of the whole next frame image X+1 (frame image (8)) is calculated (step S306). The calculated moving vector is stored in the DRAM 10 in an updating manner (step S313), and the process returns to the step S301. Therefore, when the calculated moving vector is "G" shown in FIG. 10(*ii*), (8), the "moving vector G" is to be stored in the DRAM 10 in the step S313.

When the process from the step S301 is executed again, a frame image (8) successive from the frame image (7) in FIG. 10(*i*) is selected as a current frame image X in the step S301. However, because the frame image X (8) has the "object not suitable for calculation of a characteristic amount" picked up in all first to fourth priority order areas, no characteristic amount greater than or equal to the predetermined value is calculated in any of the first to fourth priority order areas, and the determination result in the step S303 becomes NO.

Therefore, the process progresses to the step S311 from the step S303, and the DSP/CPU 3 searches a block in a next frame image X+1 (flame image next to the current frame selected in the step S301) based on a characteristic amount calculated at last (step S311). At this time, because the characteristic amount calculated at last is calculated from the frame (6) in FIG. 10(*i*), and a block is searched in a frame image (9) which is a next frame image X+1 in FIG. 10(*ii*) based on a characteristic amount f of the frame image (6). Then, likewise the step S306, the moving vector of the whole next frame image X+1 (frame image (9)) is calculated (step S306). The calculated moving vector is stored in the DRAM 10 in an updating manner (step S313), and the process returns to the step S301. Therefore, when the moving vector calculated at this time is "H" in FIG. 10(*ii*), (9), the "moving vector H" is stored in the DRAM 10 instead of the "moving vector G" through the process in the step S313.

When the process from the step S301 is executed again, a frame image (9) successive from the frame image (8) in FIG. 10(*i*) is selected as a current frame image X in the step S301. The frame image X (9) has a fourth priority order area where a "characteristic amount g" can be calculated, so that the determination result in the step S303 becomes YES. Thus, the process progresses to the step S304 from the step S303, and the DSP/CPU 3 determines whether or not there is an updated moving vector which is a moving vector stored in the DRAM 10 in the step S313 (step S304).

In the embodiment, the process at the step S303 is repeated twice, and the updated moving vector H of the second time is stored in the DRAM 10. Therefore, the determination result in the step S304 becomes YES, and the process progresses to step S314 from the step S304, and the DSP/CPU 3 reads out the updated moving vector H stored in the DRAM 10 (step S314).

Next, the DSP/CPU 3 sets an extraction width which is the width of a partial image to be extracted (step S315). Setting of the extraction width is carried out by reading out an extraction width W corresponding to the magnitude of the moving direction component (magnitude of left direction component in the embodiment) in the updated moving vector H from the conversion table 112 stored beforehand in the flash memory 11 shown in FIG. 6C.

Subsequently, the DSP/CPU 3 extracts an image from a frame image where a partial image is extracted at last by the foregoing extraction width W from the reference line L (step S316). That is, in the embodiment, as shown in FIG. 10(iii), that frame image where a partial image is extracted at last is the frame image (6) where the partial image F is extracted. Therefore, as shown in FIG. 10(iv), first, the reference line L which is a straight line passing through near the center of the frame and is in a direction orthogonal to the moving vector is set over the frame image (6). Then, a partial image WH is extracted at the extraction width W from the reference line L in the frame image (6) in the moving direction of the electronic camera 1 which is the opposite direction to the moving vector.

Thereafter, the DSP/CPU 3 synthesizes the partial image WH with a partial image, synthesized at last, of a panorama synthetic image synthesized up to this point in an overwriting manner (step S317).

That is, as mentioned before, in case of the frame images (1) to (6), the partial images WA, WB, WC, WD, WE, and WF are extracted at extraction widths corresponding to the moving vector A, B, C, D, E, and F from the reference line L, from the current frame images (1) to (6), and the partial images WA, WB, WC, WD, WE, and WF are combined and synthesized together through the process in the step S309. In the synthetic image comprising the partial images WA, WB, WC, WD, WE, and WF, a partial image which is synthesized at last is the partial image WF. Therefore, the partial image WH is synthesized with the partial image WF in an overwriting manner, and as shown in FIG. 10(v), the partial image WH is combined with the partial image WE.

Thereafter, the DSP/CPU 3 progresses the process to the step S305 from the step S317, and executes the process after the step S305. Therefore, in the step S305, a frame image (10) in FIG. 10(ii) which is a next frame image X+1 is subjected to searching based on a characteristic amount g of the frame image (9) in FIG. 10(i), the moving vector I thereof is calculated in the step S306, a width W corresponding to the moving vector is set in the step S307, a partial image WI is extracted at the extraction width from the reference line L, from the frame image (9) in FIG. 10(ii), which is a current frame image X, in the step S308, and the partial image WH is combined and synthesized with a synthetic image having the partial image WH at an end portion in the step S309.

As shown in FIG. 10(i), (10) to (14), in a case where the image of an object other than the "object not suitable for calculation of a characteristic amount" is picked up in any of first to fourth priority order areas, the determination result in the step S303 becomes YES, and the determination result in the step S304 becomes NO. Therefore, the routine from the step S301 to the step S310 is then repeated.

In a case where a fifteenth frame image (15) shown in FIG. 10(i) is stored in the DRAM 10, when a second frame image (14) from the last is selected in the step S301, the determination result in the step S310 becomes YES.

That is, when determining that the partial-image synthesis process is performed on up to the second frame image from the last (step S310: YES), the DSP/CPU 3 executes a cutout and storing process which is the same process as that in the step S209 (step S318). Accordingly, a panorama image eventually acquired by combining the partial images of WA-WB-WC-WD-WE-WH-WI-WJ-WK-WL-WM-WN as shown in FIG. 10(v) is stored in the memory card 13.

That is, according to the embodiment, in a case where a panorama image is created based on a plurality of frame images picked up in such a way that a part of an object image overlaps between at least frame images successive in time, when a predetermined area set beforehand in a frame image is not suitable as a characteristic amount calculation area, that frame area is eliminated from an image subjected to panorama synthesizing, partial images are successively extracted based on a moving vector calculated between a first frame image and a second image having a predetermined correspondence relationship in time, and combined together, thereby creating a panorama image.

Figure 11:
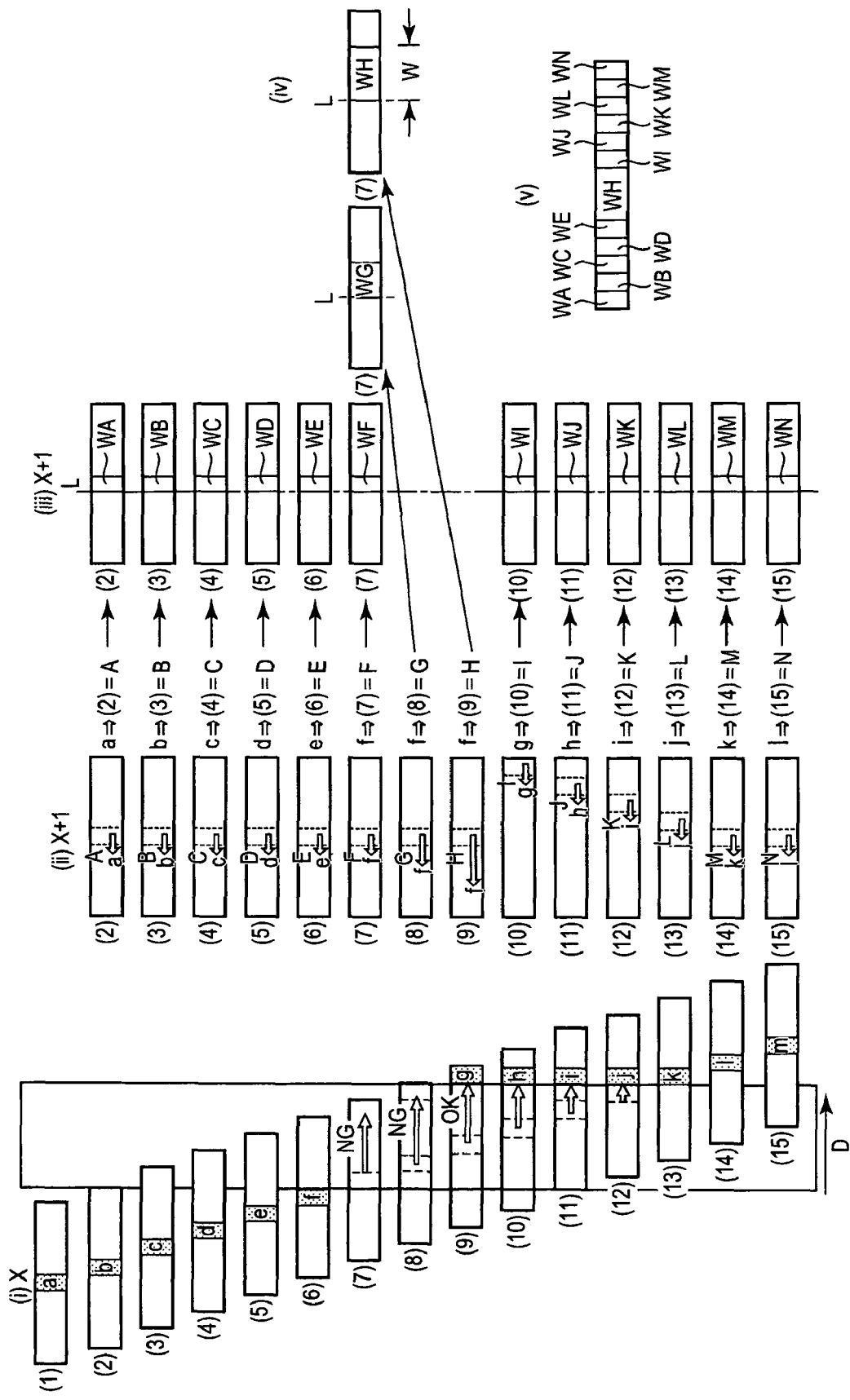
FIG. 11 is an explanatory diagram for a case where a partial image is extracted from a next frame image.

Although a partial image is extracted from a current frame image X, the partial image may be extracted from a next frame image X+1 as shown in FIG. 11. In this case, as shown in FIG. 11(iii), individual partial images WA, WB, WC, WD and the like may be cut out from next frame images (2), (3), (4), (5) and the like in a moving vector direction (direction opposite to the moving direction D of the electronic camera 1).

Although a partial image is combined with a synthetic image right after it is extracted, the extracted partial image may be saved, and may be synthesized with a synthetic image when a next characteristic amount is calculated. According to this scheme, it is not necessary to overwrite a partial image on a partial image, synthesized at last, of a panorama synthetic image synthesized up to this point as indicated in the step S317, and a panorama synthetic image can be obtained without overwriting.

The explanation has been given of a case where a panorama synthetic image in the horizontal direction is created in the foregoing embodiments, but the invention can be applied to a case where a panorama synthetic image in the vertical direction is created.

As shown in the flowcharts of FIGS. 4 and 9, the image synthesis process is started with the first frame image stored in the DRAM 10 as a target to be synthesized in the foregoing embodiments. However, calculation of a characteristic amount and calculation of a moving vector may be executed at the beginning of the image synthesis process, and if a moving vector greater than or equal to a predetermined value is calculated, the process after the step S201, or the process from the step S301 may be executed.

This makes it possible to detect whether or not the user moves the electronic camera 1, i.e., the user starts moving the electronic camera 1 while having an intension of starting panorama image pickup. Therefore, execution of a panorama image synthesis process using unnecessary images acquired before the user starts moving the electronic camera 1 with an intension of starting panorama image pickup can be avoided.

At this time, the electronic camera 1 may employ a structure of detecting which direction in vertical and horizontal direction the moving direction of the electronic camera 1 is in based on the direction of a detected moving vector greater than or equal to a predetermined value, and of performing panorama-image synthesis process in accordance with the detected moving direction of the electronic camera 1. That is, for example, when the electronic camera 1 is moved leftward or rightward, a panorama synthetic image in the horizontal direction is created, and when the electronic camera 1 is moved in the upward or downward direction, a panorama synthetic image in the vertical direction is created. Further, when it is detected that the electronic camera 1 is moved rightward for example, priority orders for extraction areas for characteristic amounts may be set in a table of FIG. 8A, and when it is detected that the electronic camera 1 is moved leftward, priority orders for extraction areas for characteristic amounts may be set in a table of FIG. 8B.

As shown in the flowcharts of FIGS. 4 and 9, the image synthesis process is terminated at a time when a second frame image from the last is selected in the foregoing embodiments. However, a moving vector detected at first may be stored, and when a moving vector having a different direction (e.g., opposite direction) from the stored moving vector is detected, the image synthesis process may be terminated.

According to this scheme, panorama image pickup can be substantively terminated by a simple operation of moving the electronic camera 1, which has been moved to perform panorama image pickup, in a direction different from the moving direction without a shutter key release explained in the step S104.

Further, the image pickup process is executed, a plurality of frame images is stored in the DRAM 10, and then the image synthesis process is executed in the foregoing embodiments. However, every time a frame image is acquired through the image pickup process, the image synthesis process may be executed successively.

Third Embodiment

According to the foregoing embodiments, partial images are extracted from respective plural frame images, and the extracted partial images are combined and synthesized together to create a panorama synthetic image. Therefore, the panorama synthetic image has a plurality of joint lines formed unavoidably therein. In the third embodiment, a frame image intended by the user is overwritten on a panorama synthetic image to acquire a panorama synthetic image having no joint line by image synthesizing at a portion where the user has an intension.

The electronic camera 1 of the third embodiment has the same structure as that of the first embodiment.

However, in the third embodiment, the DSP/CPU 3 operates in accordance with the operation program to function as the characteristic amount calculation unit, image area extraction unit, image area searching unit, moving vector calculation unit, cutout width setting unit, image cutout unit, image synthesis unit, and overwriting synthesis unit of the invention.

In the third embodiment, the key input unit 7 includes a plurality of operation keys, such as a shutter key, a panorama-image-pickup start key, and a panorama-image-pickup end key, a power key, a mode selection key, and a set of arrow keys, and outputs a key input signal according to a key operation by the user to the DSP/CPU 3.

Likewise the first embodiment, the electronic camera 1 of the third embodiment executes a process represented by the flowchart of FIG. 2 in accordance with the operation program.

Figure 12:
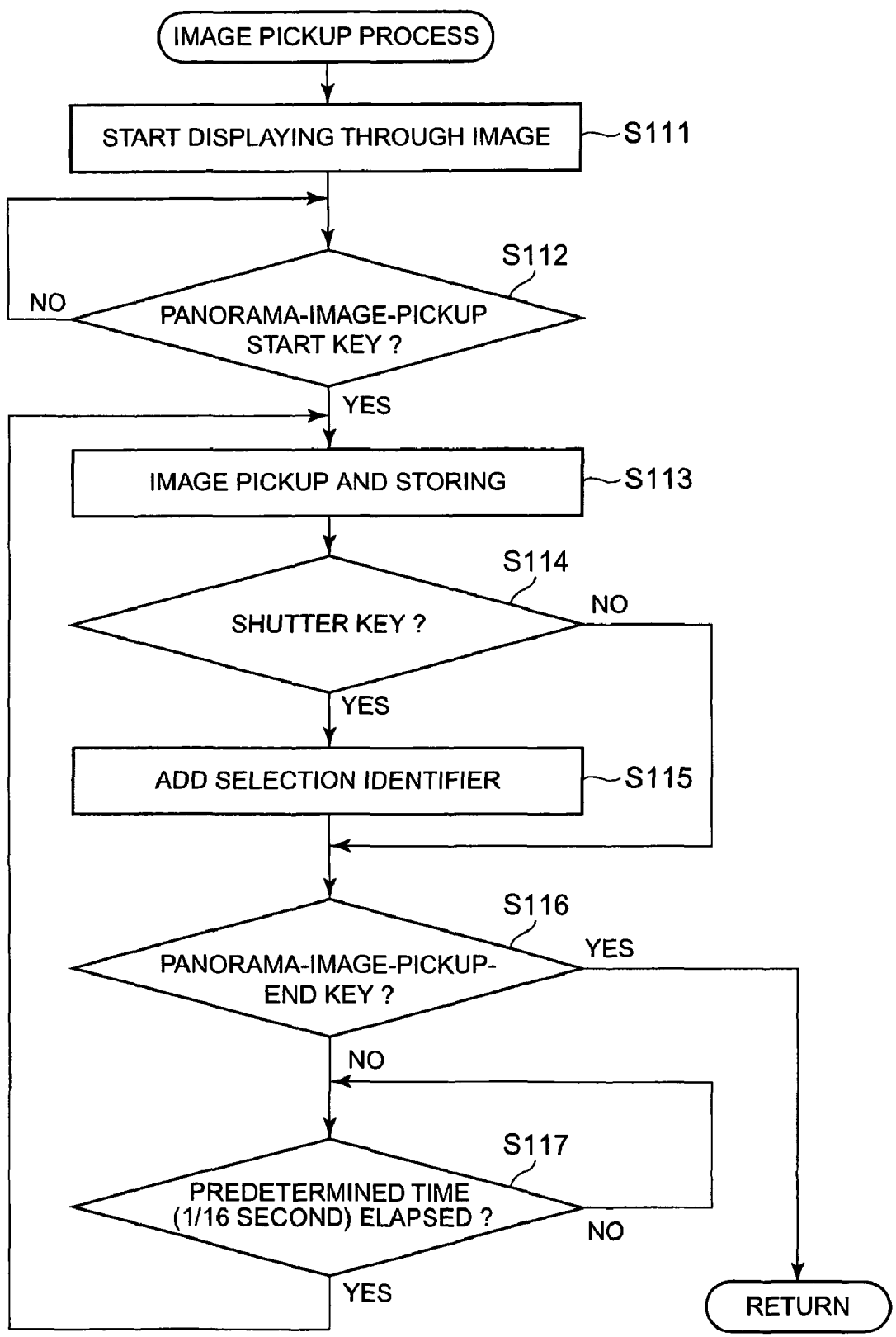
FIG. 12 is a flowchart showing the procedure of an image pickup process according to the third embodiment of the invention.

FIG. 12 is a flowchart showing the procedure of the image pickup process (step S1) according to the third embodiment.

First, the DSP/CPU 3 starts displaying a through image (step S111). The display device 6 displays a through image through the process in the step S111.

Next, the DSP/CPU 3 determines whether or not the panorama-image-pickup start key is operated (step S112). When determining that the panorama-image-pickup start key is operated (step S112: YES), the DSP/CPU 3 executes an image pickup and recording process to capture a frame image from the CCD 2 and to save it in the DRAM 10 (step S113).

Next, the DSP/CPU 3 determines whether or not the shutter key is operated (step S114). When determining that the shutter key is not operated (step S114: NO), the DSP/CPU 3 progresses the process to step S116 without executing the process at step S115, and determines whether or not the panorama-image-pickup end key is operated (step S114).

When determining that the panorama-image-pickup end key is not operated (step S114: NO), the DSP/CPU 3 determines whether or not a predetermined time ($\frac{1}{16}$ second in the embodiment) elapsed (step S117). At a time when the predetermined time elapsed (step S117: YES), the DSP/CPU 3 repeats the process from the step S113. Therefore, the process from the step S115 is repeated at a predetermined time ($\frac{1}{6}$ second) interval until the panorama-image-pickup end key is operated.

In panorama image pickup, the user moves the electronic camera 1 in parallel in a desired direction or rotating the direction at which the electronic camera 1 performs image pickup in a desired direction to perform image pickup. In this case, when a main object like a central figure intended by the user comes in a finder (preferably, when the main object comes to the center of the finder), the user operates the shutter key. When determining that the shutter key is operated (step S114; YES), the DSP/CPU 3 adds a selection identifier to a frame image stored in the DRAM 10 when the user operates the shutter key to discriminate the frame image from other frame images (step S115).

When determining that the user operates the panorama-image-pickup end key (step S116: YES), the DSP/CPU 3 returns the process to the general flow shown in FIG. 2. Therefore, a plurality of frame image picked up at a predetermined time ($\frac{1}{6}$ second) interval from when the user operates the panorama-image-pickup start key to when the user operates the panorama-image-pickup end key are to be stored in the DRAM 10. At this time, if the user performs panorama image pickup while moving the electronic camera 1 in a desired direction, i.e., a right direction in parallel to perform image pickup, a plurality of frame images where the object moves in a direction opposite to the moving direction of the electronic camera 1 are to be stored in the DRAM 10.

When the user operates the shutter key in panorama image pickup, the DSP/CPU 3 adds a selection identifier to a frame image picked up at the time of the operation.

FIG. 13 is a flowchart showing the procedure of the image synthesis process (step S2). Note that an explanation will be given of a case where the image synthesis process is performed on a plurality of frame images acquired by image pickup while moving the electronic camera 1 in a right direction as mentioned before. That is, an explanation will be given of a case where the image synthesis process is performed on a plurality of frame images having the object looked like moving leftward over time between individual frame images.

First, the DSP/CPU 3 selects the frame images in an order stored in the DRAM 10 (step S401). That is, the DSP/CPU 3 selects the frame images in an order that the frame images are picked up.

Next, the DSP/CPU 3 calculates the characteristic amount of the selected frame image (step S402). In calculating the characteristic amount, as shown in FIG. 5A, a plurality of blocks BL set near the center (central area) of a current frame X selected in the step S401 are taken as remarked images. Respective characteristic amounts for the plurality of blocks BL are calculated, and a block BL having a characteristic amount greater than or equal to a predetermined value is extracted. HARRIS operator is used as an operational expression in calculating the characteristic amount. That is, a variable representing, for example, a brightness-change pattern (high-frequency component) between minute areas in that block BL is calculated as the characteristic amount.

Next, the DSP/CPU 3 searches a block BL having a corresponding characteristic amount to the extracted block BL in a next frame (after frame) image X+1, for each extracted block BL (step S403). That is, the DSP/CPU 3 searches an image area corresponding to the extracted block BL as a remarked image in the next frame (after frame) image X+1, for each block extracted from the current frame X. Note that the next frame (after frame) image X+1 is a frame image stored (picked up) next to the current frame X.

The DSP/CPU 3 detects a moving vector (X-axis component, Y-axis component) for each corresponding block having a common characteristic amount in the current frame X and the next frame X+1. The DSP/CPU 3 calculates, for example, the average value of the detected moving vectors, thereby calculating the moving vector of the whole frames (step S404). That is, a moving vector of the object image from the current frame image X to the next frame image X+1 is calculated.

Next, the DSP/CPU 3 sets an extraction width which is a width of a partial image to be extracted (step S405). Setting of the extraction width is carried out by extracting a moving direction component set beforehand from the moving vector of the whole frames, and reading out the width from the conversion table 112 stored beforehand in the flash memory 11 and shown in FIG. 6C based on the extracted moving direction component.

The conversion table 112 sets an extraction width based on a moving direction component in such a way that a line apart from the central line in the current frame image X by the extraction width in the moving direction of the electronic camera 1 (right direction in the embodiment) corresponds to the central line in the next frame image X+1.

In the case of the embodiment, it is supposed that a panorama synthetic image in the horizontal direction is to be created, and the horizontal direction component (X-axis direction component), i.e., the moving amount of the object image to left is extracted from the moving vector of the whole frames, and an extraction width W corresponding to the moving amount is to be read out.

Subsequently, the DSP/CPU 3 extracts an image from the current frame image X at the read-out extraction width with the central line of the current frame image X taken as the reference (step S406). That is, as shown in FIG. 6B, first, a central line C which is a straight line passing through the central point of the frame, and running in a direction (Y-axis direction in this case) orthogonal to the extracted moving direction component is set over the current frame image X. Then, a partial image XP of an image is extracted by the extraction width W from the central line C in the moving direction of the electronic camera 1 (right direction in this case) which is an opposite direction to the moving vector in the current frame X. That is, in a case where a partial image is extracted from the current frame X, the partial image XP is extracted in the opposite direction (moving direction of the electronic camera 1) to the moving vector with the central line C taken as the reference.

Thereafter, the DSP/CPU 3 combines and synthesizes the extracted partial image XP with the rear end portion, in the opposite direction to the moving vector, of a panorama synthetic image XS that has been synthesized up to this point, i.e., the rear end portion of the moving direction of the electronic camera 1 (right in this case) (step S407).

Subsequently, the DSP/CPU 3 determines whether or not the partial-image synthesis process is performed on up to the second frame image from the last stored in the DRAM 10 (step S408). The DSP/CPU 3 repeats the process from the step S401 until the process is performed on the second frame image from the last.

By performing such a panorama image synthesizing, in an image imaged by the optical system, an image part having no distortion at the central portion is extracted and synthesized without extracting a part on both sides having distortions. This results in a panorama synthetic image XS having no distortion across the entire area.

When extraction is performed for individual frame images with an extraction width according to the magnitude of a moving vector from the same reference central line C, images at the end edge of the extracted image from the previous frame image and at the end edge of the extracted image from the next frame image can precisely match with each other between frame images successive in time. Therefore, images picked up successively in time are precisely combined to synthesize a panorama image.

Figure 14A:
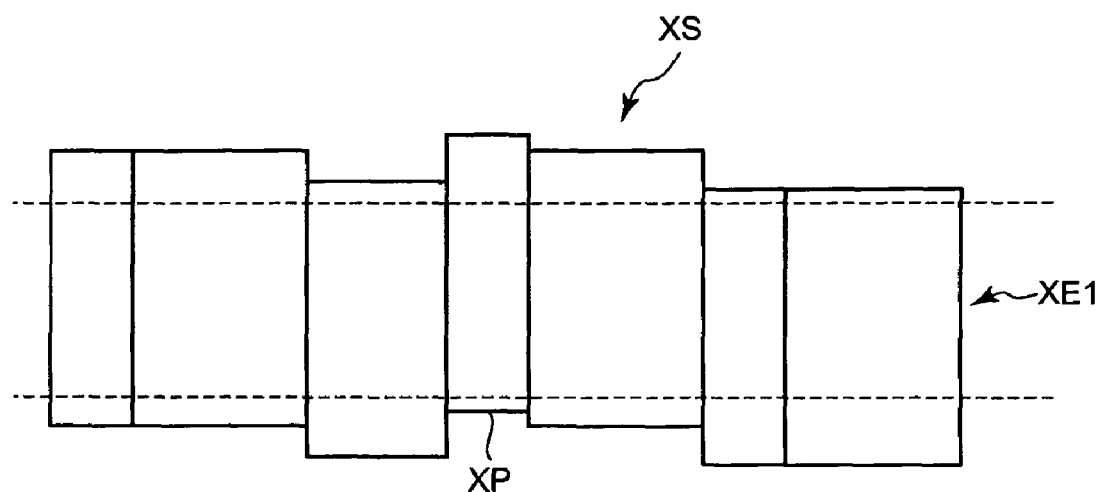
FIG. 14A is an explanatory diagram showing a trimming area of a panorama synthetic image.

Note that in image synthesizing at the step S407, alignment in the vertical direction when the end portion of the extracted partial image XP is combined and synthesized with the panorama synthetic image XS is carried out by moving and adjusting the partial image XP in the vertical direction in accordance with the vertical direction component of the moving vector. Therefore, in a case where the user moves the electronic camera 1 in a right direction even while holding it, a vibration in the vertical direction is unavoidably applied to the electronic camera 1, and the panorama synthetic image XS becomes a combined image having partial images shifted in the vertical direction as shown in FIG. 14A.

In creating the panorama synthetic image XS explained before, the plurality of frame images stored in the DRAM 10 are copied and the copied images are used, while saving the original frame images in the DRAM 10 as they are. Alternatively, for at least a frame image having an identifier, the frame image should be copied and saved.

When determining that the partial image synthesis process is performed on the second frame image from the last (step S408: YES), the DSP/CPU 3 determines whether or not there is an image having a selection identifier in the frame images stored in the DRAM 10 (step S409).

When there is no frame image having a selection identifier (step S409: NO), the DSP/CPU 3 executes a cutout and storing process (step S413) without executing the process from step S410 to S412. In the cutout and storing process, as shown in FIG. 14A, a partial image having a predetermined width along a combining direction from is cut out from a panorama synthetic image XS combined and synthesized up to the process at the last step S407 (in a case where the process in step S412 to be discussed later is executed, panorama synthetic image XS (FIG. 14B) undergone that process), and the cutout partial image is recorded as a final panorama synthetic image XE1 in the memory card 13.

That is, as mentioned before, in a case where the user moves the electronic camera 1 in a right direction even while holding it, a vibration in the vertical direction is unavoidably applied to the electronic camera 1, so that a panorama synthetic image XS becomes a combined image of partial images shifted in the vertical direction as shown in FIG. 14A. Therefore, when a partial image having a predetermined width along the combining direction is cut out, and the cutout image part is recorded as a final panorama synthetic image XE1 in the memory card 13, thereby recording and saving the panorama synthetic image XE1 having a flat periphery.

On the other hand, when determining that there is a frame image having a selection identifier (S409: YES), i.e., when the shutter key is operated during a panorama image pickup and a frame image having the main object intended by the user is selected, the DSP/CPU 3 extracts the characteristic amount of a selected frame image XF having the selection identifier (step S410). In calculating the characteristic amount, like the process in the step S402, a plurality of blocks BL set near the center of the selected frame image XF are taken as remarked images as shown in FIG. 5A. Respective characteristic amounts for the plurality of blocks BL are calculated, and a block BL having a characteristic amount greater than or equal to the predetermined value is extracted. HARRIS operator is used as an operational expression in calculating the characteristic amount.

Next, the DSP/CPU 3 searches a block BL having a common characteristic amount to the extracted block BL having the characteristic amount greater than or equal to the predetermined value in a synthetic image synthesized through the process from the step S401 to the step S408 (step S411).

Figure 14B:
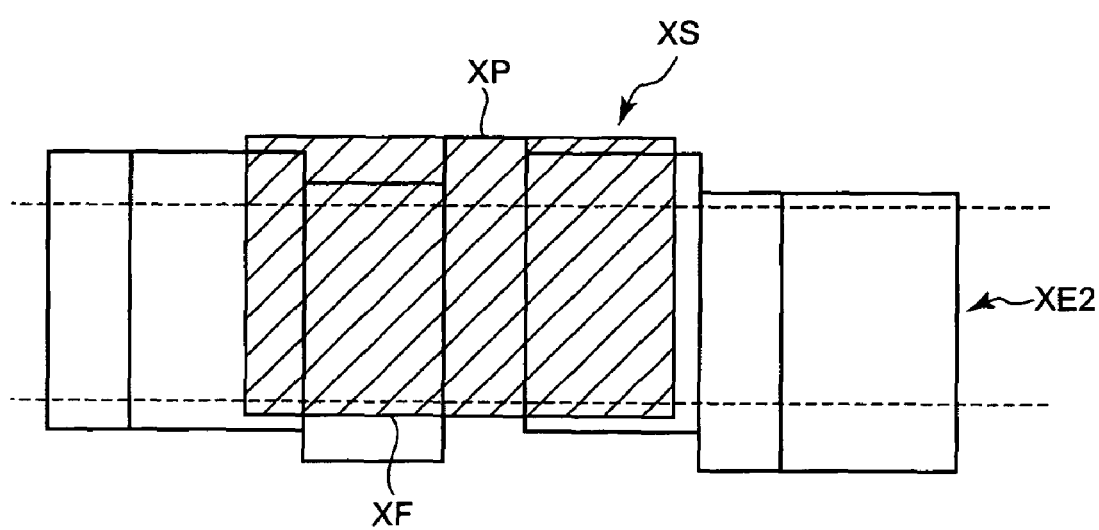
FIG. 14B is an explanatory diagram showing a state where a trimming area of a panorama synthetic image is synthesized with a frame image.

The DSP/CPU 3 overwrites the selected frame image XF on the image synthesized already in such a way that a block BL having the common characteristic amount and searched in the synthetic image in the step S411 matches a block BL that the characteristic amount is calculated in the step S410 (step S412). Accordingly, as shown in FIG. 14B, the selected frame image XF is overwritten on a panorama synthetic image XS.

A partial image having a predetermined width along the combining direction is cut out from the panorama synthetic image undergone the process in the step S412, and the cutout image part is recorded as a final panorama synthetic image XE2 in the memory card 13 through the process in the step S413.

The final panorama synthetic image XE2 includes the selected frame image XF which is an undivided frame image intended by the user, so that a panorama synthetic image can be acquired without creating a joint line at a portion where the user intends.

Image parts at the central portions having no distortion can be extracted and combined together without extracting a part having distortions at both sides in images imaged by the optical system by performing image-piece synthesizing of extracting partial images XP and combining them with the central line C taken as the reference. On the other hand, a panorama synthetic image should have plural unavoidable joint lines. However, according to the embodiment, the panorama synthetic image XS2 includes the undivided frame image XF, so that the number of joint lines can be reduced.

Therefore, a panorama synthetic image having no joint line at a part where the user intends, and having no distortion at portions other than the selected frame image XF can be acquired by image-piece synthesizing.

Further, according to the embodiment, a frame image picked up at a time when the shutter key is operated is used as a selected frame image XF, a panorama synthetic image can be obtained without creating a joint line in a frame image at a time when the user operates the shutter key at a shutter chance.

Fourth Embodiment

Panorama image pickup is started and terminated using the panorama-image-pickup start key and the panorama-image-pickup end key, and a selected frame image XF is selected using the shutter key in the third embodiment. However, according to the fourth embodiment, panorama image pickup can be started and terminated and a selected frame XF is selected using only the shutter key.

The electronic camera 1 of the fourth embodiment has the same structure as that of the third embodiment.

The electronic camera 1 of the fourth embodiment executes the process shown in FIG. 2 in accordance with the operation program like the first embodiment.

Figure 15:
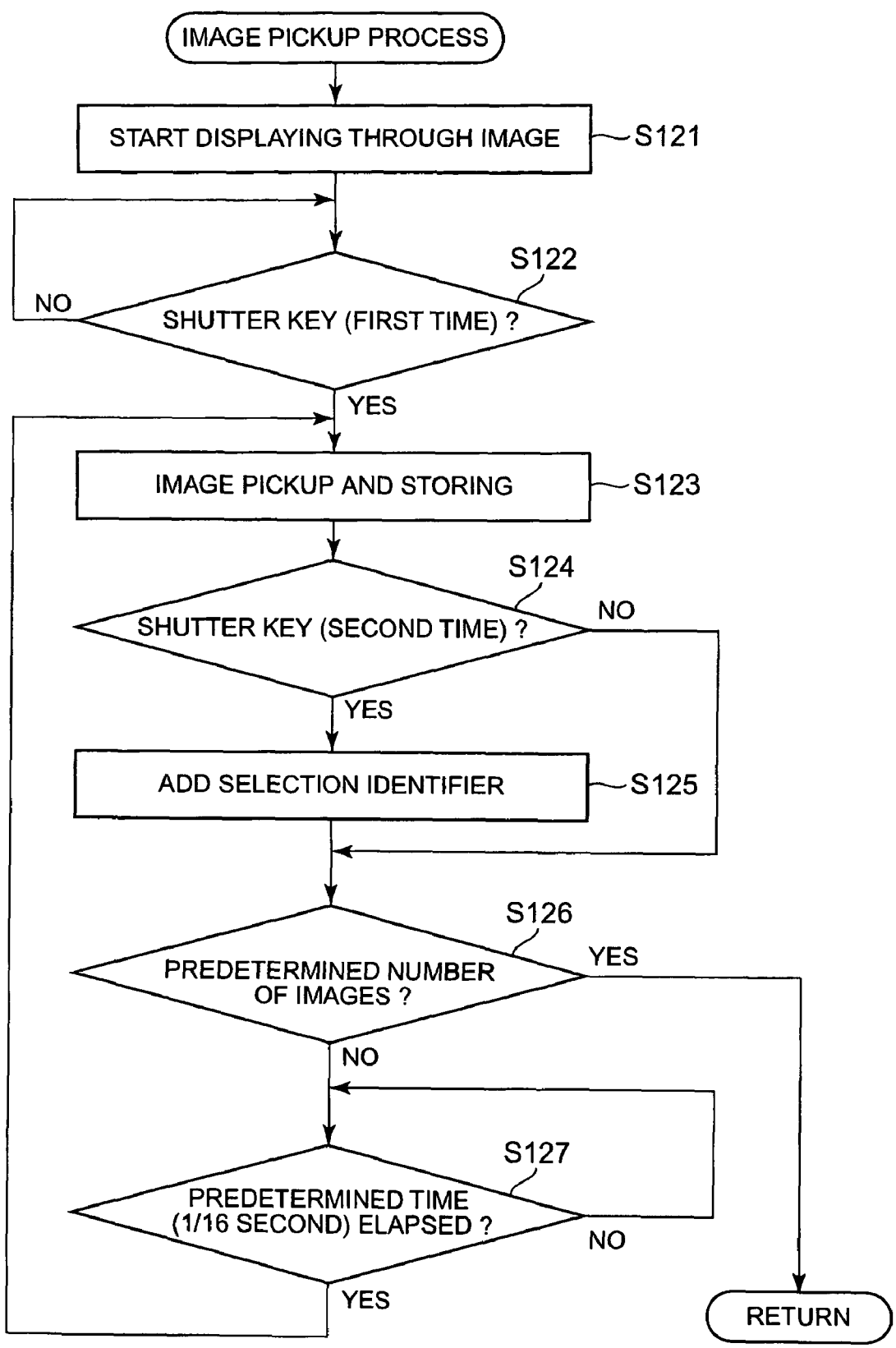
FIG. 15 is a flowchart showing the procedure of an image pickup process according to the fourth embodiment of the invention.

FIG. 15 is a flowchart showing the procedure of an image pickup process (step S1) according to the fourth embodiment of the invention.

First, the DSP/CPU 3 start displaying a through image (step S121). The display device 6 displays a through image through the process in the step S121.

Next, the DSP/CPU 3 determines whether or not the shutter key is operated (first time) (step S122).

When determining that the shutter key is operated (step S122: YES), the DSP/CPU 3 executes an image pickup and recording process to capture a frame image from the CCD 2 and save it in the DRAM 10 (step S123).

Next, the DSP/CPU 3 determines whether or not the shutter key is operated (second time) (step S124).

When determining that the shutter key is not operated (step S124: NO), the DSP/CPU 3 progresses the process to step S126 without executing the process at step S125, and determines whether or not a predetermined number of images are picked up (step S124).

When the predetermined number of images are not picked up (step S124: NO), the DSP/CPU 3 determines whether or not a predetermined time ($1/6$ second in the embodiment) elapsed (step S127).

When determining that the predetermined time elapsed (step S127: YES), the DSP/CPU 3 returns the process to the step S123. That is, at a time when the predetermined time elapsed, the process from the step S123 is repeated. Therefore, the process from the step S125 is to be repeated at a predetermined time ($1/6$ second) interval until the predetermined numbers of images are picked up.

In panorama image pickup, the user picks up an image while moving the electronic camera 1 in a desired direction, and when a main object like a central figure intended by the user comes in the finder (preferably, when the central figure comes to the center of the finder), the user operates the shutter key (operation after the second time).

When determining that the second time shutter key operation is performed (step S124: YES), the DSP/CPU 3 adds a selection identifier to a frame image stored in the DRAM 10 at a time when the user performs the shutter key operation after the second time to identify the frame image from other frame images (step S125).

When the predetermined number of images are picked up and recorded, the determination result in the step S126 becomes YES, and the process returns to the general flow shown in FIG. 2. Therefore, the predetermined number of frame images picked up at the predetermined time ($1/6$ second) interval after the user operated the shutter key at the first time are stored in the DRAM 10. At this time, let us suppose that the user picked up images while moving the electronic camera 1 in a desired direction, i.e., in the right direction to perform panorama image pickup, then a plurality of frame images having the object moved in the opposite direction to the moving direction of the electronic camera 1 are to be stored in the DRAM 10.

In a case where the user further operates the shutter key in panorama image pickup, a frame image picked up at this operation is added with a selection identifier.

Therefore, according to the embodiment, selection of starting and terminating panorama image pickup, and selection of a desired frame image can be carried out with the shutter key only, without additional panorama-image-pickup start key and panorama-image-pickup end key.

Note that the image synthesis process in the fourth embodiment (step S2) can be executed by the same procedure as that of the third embodiment shown in the flowchart of FIG. 13.

Fifth Embodiment

According to the fifth embodiment, a frame image subject to overwriting and synthesizing is selected from created synthetic images.

The electronic camera 1 of the fifth embodiment has the same structure as that of the third embodiment.

The electronic camera 1 of the fifth embodiment executes the process represented by the flowchart of FIG. 2 in accordance with the operation program like the first embodiment.

The electronic camera 1 of the fifth embodiment executes an image pickup process represented by the flowchart of FIG. 3 at the step S1 in accordance with the operation program like the first embodiment.

Figure 16:
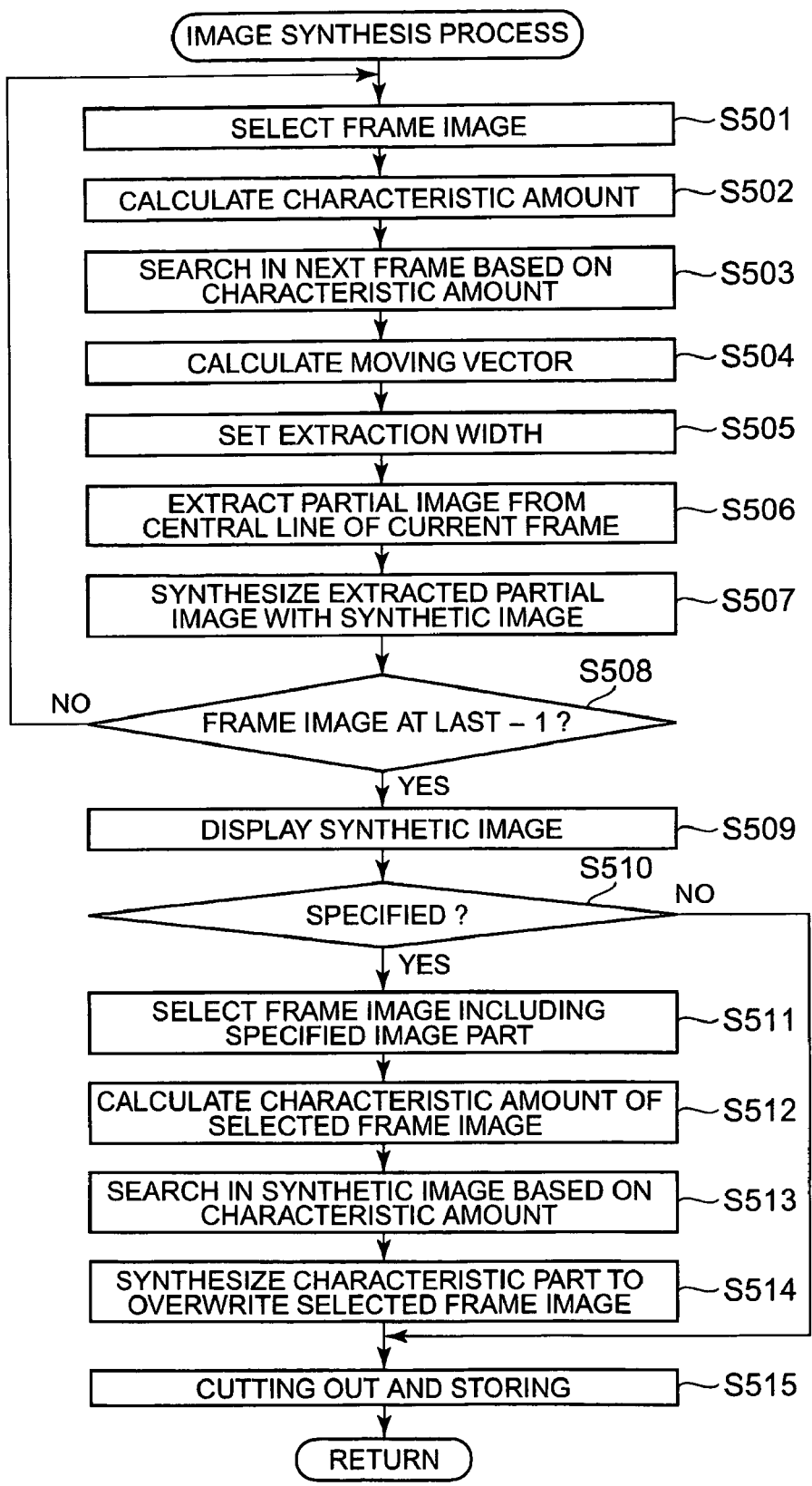
FIG. 16 is a flowchart showing the procedure of an image synthesis process according to the fifth embodiment of the invention.

FIG. 16 is a flowchart showing the procedure of the image synthesis process (step S2) in the embodiment. An explanation will be given of a case where the image synthesis process is performed on a plurality of frame images obtained by performing image pickup while moving the electronic camera 1 in a right direction. That is, an explanation will be given of a case where the image synthesis process is performed on a plurality of frames having an object looked like as if it is moving to left over time between individual frame images.

First, the DSP/CPU 3 selects frame images in a stored order in the DRAM 10 (step S501). That is, the frame images are selected in an order picked up.

Next, the DSP/CPU 3 calculates the characteristic amounts of respective selected frame images (step S502). In calculating a characteristic amount, as shown in FIG. 5A, a plurality of blocks BL set near the center (central area) of a current frame X selected at the step S501 are taken as remarked images. The characteristic amounts for the plurality of respective blocks BL are calculated, and a block BL having the characteristic amount greater than or equal to a predetermined value is extracted. HARRIS operator is used as an operational expression in calculating the characteristic amount. That is, for example, a variable representing a brightness change pattern (high frequency component) between minute areas in a block BL is calculated as the characteristic amount.

Figure 5B:
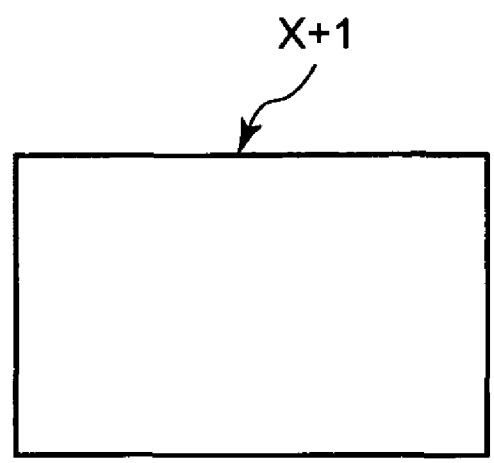

Next, for each extracted block BL, the DSP/CPU 3 searches a block BL having the corresponding characteristic amount to that extracted block BL in a next frame (after frame) image X+1 shown in FIG. 5B (step S503). That is, for each block BL extracted from the current frame image, an image area corresponding that block BL as a remarked image is searched in the next frame (after frame) image X+1. The next frame (after frame) image X+1 is a frame image stored (picked up) next to the current frame image X.

The DSP/CPU 3 detects a moving vector for each corresponding block BL having the common characteristic amount in the current frame image X and the next frame image X+1. Further, the DSP/CPU 3 calculates, for example, the average value of the detected moving vectors, thereby calculating the moving vector of the whole frames (step S504). That is, the moving vector of the object from the current frame image X to the next frame image X+1 is calculated.

Next, the DSP/CPU 3 sets an extraction width which is a width of a partial image to be extracted (step S505). Setting of the extraction width is carried out by extracting a preset moving direction component from the moving vector of the whole frames, and reading out the width from a conversion table 112 prestored in the internal flash memory 11 and shown in FIG. 6C based on the extracted moving direction component.

Note that the conversion table 112 sets an extraction width based on the moving direction component in such a way that a line apart from the central line of the current frame X in the moving direction of the electronic camera 1 (right direction in the embodiment) by the extraction width corresponds to the central line of the next frame image X+1.

In the case of the embodiment, it is supposed that a panorama synthetic image in the horizontal direction is to be created, and a vertical direction component (X-axis direction component) of the whole frames, i.e., for example, the moving amount of the object image in the left direction is extracted, and an extraction width W corresponding to the moving amount is to be read out.

Subsequently, the DSP/CPU 3 extracts an image from the current frame image X at the foregoing extraction width with the predetermined central line of the current frame X taken as the reference (step S506). That is, as shown in FIG. 6B, first, a central line C which is a straight line passing through the central point of the frame and running in a direction (Y-axis direction in the embodiment) orthogonal to the extracted moving direction component is set over the current frame X. A partial image XP of the image is extracted by the extraction width W in the moving direction of the electronic camera 1 (right direction in the embodiment) that is an opposite direction of the moving vector from the central line C in the current frame image X. That is, in extracting a partial image from the current frame image X, a partial image XP is extracted in a direction opposite to the moving vector (moving direction of the electronic camera 1) with the central line C taken as the reference.

Thereafter, the DSP/CPU 3 combines and synthesizes the extracted partial image XP with the rear end portion, which is in a direction opposite to the moving vector, of a panorama synthetic image XS which has been synthesized at present time, i.e., the rear end portion in the moving direction of the electronic camera 1 (right side in the embodiment) as shown in FIG. 6A (step S507).

Subsequently, the DSP/CPU 3 determines whether or not the process relating to a characteristic amount calculation is performed on up to a frame image which is the second frame image from the last stored in the DRAM 10 (step S508). That is, the DSP/CPU 3 repeats the process from the step S501 to the step S508 until the process is performed on the second frame image from the last.

By performing such a panorama image synthesizing, a partial image having no distortion at the central part of an image imaged by the optical system is extracted and synthesized without extracting both side parts having distortions. This results in a panorama synthetic image XS having no distortion entirely.

When extraction is performed for individual frame images by an extraction width according to the magnitude of a moving vector from the same reference central line C, images at the end edge of the extracted image from the previous frame image and at the end edge of the extracted image from the next frame image can precisely match with each other between frame images successive in time. Therefore, images picked up successively in time are precisely combined to synthesize a panorama image.

Note that in image synthesizing at the step S507, alignment in the vertical direction when the end portion of the partial image XP is combined and synthesized with the panorama synthetic image XS is carried out by moving and adjusting the partial image XP in the vertical direction in accordance with the vertical direction component of the moving vector. Therefore, in a case where the user moves the electronic camera 1 in a right direction even while holding it, a vibration in the vertical direction is unavoidably applied to the electronic camera 1, and the panorama synthetic image XS becomes a combined image having partial images shifted in the vertical direction as shown in FIG. 14A.

In creating the panorama synthetic image XS mentioned before, a plurality of frame images stored in the DRAM 10 are copied and the copied images are used, while saving the original frame images in the DRAM 10 as they are.

When determining that the process is performed on up to the second frame image from the last (step S508: YES), the DSP/CPU 3 causes the display device 6 to display the panorama synthetic image XS synthesized through the process from the step S501 to the step S507 (step S509). The user views the panorama synthetic image displayed on the display device 6, and checks whether or not a joint line is formed on the main object like a central figure intended by the user in the panorama image. When no joint line is formed on the main object, a specifying operation to be discussed later may be skipped.

The DSP/CPU 3 determines whether or not the specifying operation is performed (step S510).

When determining that the specifying operation is not performed (step S510: NO), the DSP/CPU 3 executes a cutout and storing process (step S515) without executing the process from the step S511 to the step S514. In the cutout and storing process, as shown in FIG. 14A, an image part having a predetermined width along the combining direction is cut out from the panorama synthetic image XS which has been combined and synthesized up to the last process at the step S507 (panorama synthetic image XS (FIG. 14B) undergone the process at step S514 to be discussed later when that process is executed), and the cutout image part is recorded as a final panorama synthetic image XE1 in the memory card 13.

That is, as mentioned before, in a case where the user moves the electronic camera 1 in a right direction even while holding it, a vibration in the vertical direction is unavoidably applied to the electronic camera 1, so that the panorama synthetic image XS becomes a combined image having partial images shifted in the vertical direction as shown in FIG. 14A. Therefore, the image part having the predetermined width along the combining direction is cut out, and the cutout image part is recorded as the final panorama synthetic image in the memory card 13, thereby recording and saving the panorama synthetic image XE1 having a flat periphery.

On the other hand, in a case where the user views the panorama synthetic image displayed on the display device 6 at the step S508, and when a joint line is formed on the main object like a central figure intended by the user in the panorama image or when the user wants to include an entire frame image having the main object picked up therein in a panorama picked up image, the user operates the arrow keys provided in the key input unit 7, and specifies the main object (without selecting the joint line) through a cursor or the like displayed on the display device 6.

When determining that the specifying operation is performed (step S510: YES), the DSP/CPU 3 selects a frame image corresponding to the partial image XP including the specified image part in the panorama image, from the plurality of frame images saved in the DRAM 10 (step S511). At this time, as explained with FIGS. 6A and 6B, because the partial image XP constituting the panorama synthetic image XS is a portion extracted from the central line C, a frame image having the specified main object near the central line C, i.e., almost at the center of the frame image can be selected.

Next, the DSP/CPU 3 extracts the characteristic amount of a frame image XF selected in the step S511 (step S512). In calculating the characteristic amount, likewise the foregoing process in the step S502, a plurality of blocks BL set near the center (central area) of the selected frame image XF are taken as remarked images. Respective characteristic amounts for the plurality of blocks BL are calculated, and a block BL having a characteristic amount greater than or equal to a predetermined value is extracted. HARRIS operator is used as an operational expression in calculating the characteristic amount.

Subsequently, the DSP/CPU 3 searches a block BL having the common characteristic amount to each extracted block BL having the calculated characteristic amount greater than or equal to the predetermined value in a synthetic image synthesized until the determination result at the step S508 becomes YES (step S513).

The DSP/CPU 3 overwrites the selected frame image XF on the synthetic image in such a way that a block BL having the common characteristic amount in the synthetic image searched in the step S513 matches a block BL having the characteristic amount calculated in the step S512 (step S514). Accordingly, the selected frame XF is overwritten on the panorama synthetic image XS as shown in FIG. 14B. Then, as shown in FIG. 14B, an image part having a predetermined width along the combining direction is cut out from the panorama synthetic image XS undergone the process in the step S512, through the process at the foregoing step S515, and the cutout image part is recorded as a final panorama synthetic image XE2 in the memory card 13.

Therefore, according to the embodiment, because the user can select a frame image at leisure after finishing panorama image pickup, a panorama synthetic image having a portion intended by the user can be further surely obtained without forming a joint line due to image synthesizing thereon.

Image parts of the central portions having no distortion can be extracted and combined together without extracting a part having distortions on both sides in images imaged by the optical system by performing image-piece synthesizing of extracting partial images XP and combining them with the central line C taken as the reference as mentioned before. On the other hand, a panorama synthetic image should have plural unavoidable joint lines. However, according to the embodiment, the panorama synthetic image XS2 includes the undivided frame image XF, so that the number of joint lines can be reduced.

Therefore, a panorama synthetic image having no joint line at a part where the user intends, and having no distortion at portions other than the selected frame image XF can be acquired by image-piece synthesizing.

Sixth Embodiment

According to the fifth embodiment, a block BL in a selected frame image is searched in a synthetic image, a selected frame image XF is overwritten on a panorama synthetic image XS in a matching manner based on the searched block BL. According to the sixth embodiment, however, a selected frame image XF is overwritten on a panorama synthetic image XS in an matching manner based on a partial image XP in the selected frame image and a partial image XP, corresponding to that partial image XP, in the panorama synthetic image XS.

The electronic camera 1 of the sixth embodiment has the same structure as that of the third embodiment.

The electronic camera 1 of the sixth embodiment executes the process represented by the flowchart of FIG. 2 in accordance with the operation program like the first embodiment.

The electronic camera 1 of the sixth embodiment executes an image pickup process represented by the flowchart of FIG. 3 in the step S1 in accordance with the operation program like the first embodiment.

FIG. 17 is a flowchart showing the procedure of the image synthesis process (step S2) in the sixth embodiment. Note that likewise the explanation with reference to FIG. 12 given in, for example, the third embodiment of the invention, an explanation will be given of a case where the image synthesis process is performed on a plurality of frame images acquired by performing image pickup while moving the electronic camera 1 in a right direction. That is, the image synthesis process is performed on the plurality of frame images having an object image looked like as if it is moving to left over time between individual frame images.

First, the DSP/CPU 3 selects the frame images in an order stored in the DRAM 10 (step S601). That is, the frame images are selected in a picked-up order.

Next, the DSP/CPU 3 calculates the characteristic amount of the selected frame image (step S602). In calculating the characteristic amount, as shown in FIG. 5A, a plurality of blocks BL set near the center (central area) of a current frame X selected in the step S601 are taken as remarked images. Respective characteristic amounts for the plurality of blocks BL are calculated, and a block BL having a characteristic amount greater than or equal to a predetermined value is extracted. HARRIS operator is used as an operational expression in calculating the characteristic amount. That is, a variable representing, for example, a brightness-change pattern (high-frequency component) between minute areas in that block BL is calculated as the characteristic amount.

Next, the DSP/CPU 3 searches a block BL having a corresponding characteristic amount to the extracted block BL in a next frame (after frame) image X+1, for each extracted block BL (step S603). That is, the DSP/CPU 3 searches an image area corresponding to the extracted block BL as a remarked image in the next frame (after frame) image X+1, for each block extracted from the current frame X. Note that the next frame (after frame) image X+1 is a frame image stored (picked up) next to the current frame X.

The DSP/CPU 3 detects a moving vector (X-axis component, Y-axis component) for each corresponding block having a common characteristic amount in the current frame X and the next frame X+1. The DSP/CPU 3 calculates, for example, the average value of the detected moving vectors, thereby calculating the moving vector of the whole frames (step S604). That is, a moving vector of the object image from the current frame image X to the next frame image X+1 is calculated.

Next, the DSP/CPU 3 sets an extraction width which is a width of a partial image to be extracted (step S605). Setting of the extraction width is carried out by extracting a moving direction component set beforehand from the moving vector of the whole frames, and reading out the width from the conversion table 112 stored beforehand in the flash memory 11 and shown in FIG. 6C based on the extracted moving direction component.

The conversion table 112 sets an extraction width based on a moving direction component in such a way that a line apart from the central line in the current frame image X by the extraction width in the moving direction of the electronic camera 1 (right direction in the embodiment) corresponds to the central line in the next frame image X+1.

In the case of the embodiment, it is supposed that a panorama synthetic image in the horizontal direction is to be created, and the horizontal direction component (X-axis direction component), i.e., the moving amount of the object image to left is extracted from the moving vector of the whole frames, and an extraction width W corresponding to the moving amount is to be read out.

Subsequently, the DSP/CPU 3 extracts an image from the current frame image X at the read-out extraction width with the central line of the current frame image X taken as the reference (step S606). That is, as shown in FIG. 6B, first, a central line C which is a straight line passing through the central point of the frame and running in a direction (Y-axis direction in this case) orthogonal to the extracted moving direction component is set over the current frame image X. Then, a partial image XP of an image is extracted by the extraction width W from the central line C in the moving direction of the electronic camera 1 (right direction in this case) which is an opposite direction to the moving vector in the current frame X. That is, in a case where a partial image is extracted from the current frame X, the partial image XP is extracted in the opposite direction (moving direction of the electronic camera 1) to the moving vector with the central line C taken as the reference.

Thereafter, the DSP/CPU 3 combines and synthesizes the extracted partial image XP with the rear end portion, in the opposite direction to the moving vector, of a panorama synthetic image XS synthesized up to this point, i.e., the rear end portion of the moving direction of the electronic camera 1 (right in this case) (step S607).

Subsequently, the DSP/CPU 3 determines whether or not the partial image synthesis process is performed on up to the second frame image from the last stored in the DRAM 10 (step S608). The DSP/CPU 3 repeats the process from the step S601 until the process is performed on the second frame image from the last.

By performing such a panorama image synthesizing, in an image imaged by the optical system, an image part having no distortion at the central portion is extracted and synthesized without extracting a part on both sides having distortions. This results in a panorama synthetic image XS having no distortion across the entire area.

When extraction is performed for individual frame images with an extraction width according to the magnitude of a moving vector from the same reference central line C, images at the end edge of the extracted image from the previous frame image and at the end edge of the extracted image from the next frame image can precisely match with each other between frame images successive in time. Therefore, images picked up successively in time are precisely combined to synthesize a panorama image.

Note that in image synthesizing at the step S607, alignment in the vertical direction when the end portion of the extracted partial image XP is combined and synthesized with the panorama synthetic image XS is carried out by moving and adjusting the partial image XP in the vertical direction in accordance with the vertical direction component of the moving vector. Therefore, in a case where the user moves the electronic camera 1 in a right direction even while holding it, a vibration in the vertical direction is unavoidably applied to the electronic camera 1, and the panorama synthetic image XS becomes a combined image having partial images shifted in the vertical direction as shown in FIG. 14A.

In creating the panorama synthetic image XS explained before, the plurality of frame images stored in the DRAM 10 are copied and the copied images are used, while saving the original frame images in the DRAM 10 as they are.

When determining that the process from the step S601 to the step S607 is performed on up to the second frame image from the last (step S608: YES), the DSP/CPU 3 causes the display device 6 to display the synthesized panorama synthetic image XS (step S609). The user views the panorama synthetic image displayed on the display device 6, and checks whether or not a joint line is formed on the main object like a central figure intended by the user in the panorama image. When no joint line is formed on the main object, a specifying operation to be discussed later may be skipped.

The DSP/CPU 3 determines whether or not the specifying operation is performed (step S610).

When determining that the specifying operation is not performed (step S610: NO), the DSP/CPU 3 executes a cutout and storing process (step S613) without executing the process from the step S611 to the step S612. In the cutout and storing process, as shown in FIG. 14A, an image part having a predetermined width along the combining direction is cut out from the panorama synthetic image XS combined and synthesized up to the last process at the step S607 (panorama synthetic image XS (FIG. 14B) undergone the process at step S612 to be discussed later when that process is executed), and the cutout image part is recorded as a final panorama synthetic image XE1 in the memory card 13.

That is, as mentioned before, in a case where the user moves the electronic camera 1 in a right direction even while holding it, a vibration in the vertical direction is unavoidably applied to the electronic camera 1, so that the panorama synthetic image XS becomes a combined image having partial images shifted in the vertical direction as shown in FIG. 14A. Therefore, the image part having the predetermined width along the combining direction is cut out, and the cutout image part is recorded as the final panorama synthetic image in the memory card 13, thereby recording and saving the panorama synthetic image XE1 having a flat periphery.

On the other hand, in a case where the user views the panorama synthetic image displayed on the display device 6 at the step S608, and when a joint line is formed on the main object like a central figure intended by the user in the panorama image or when the user wants to include an entire frame image having the main object picked up therein in a panorama picked up image, the user operates the arrow keys provided in the key input unit 7, and specifies the main object (without selecting the joint line) through a cursor or the like displayed on the display device 6.

When determining that the specifying operation is performed (step S610: YES), the DSP/CPU 3 selects a frame image from which the partial image including the specified image part is extracted in the plurality of frame images saved in the DRAM 10 (step S611). That is, because the panorama synthetic image XS is a combined image having the partial images extracted from the respective frame images, the partial image including he specified image part is one which is extracted from any one of the frame images. Therefore, the frame image that the partial image including the selected image part is originally extracted is selected from the plurality of frame images saved in the DRAM 10. Let us now suppose that a partial image XP shown in FIG. 14A is the partial image including the specified image part, then an original frame image XF from which the partial image XP shown in FIG. 14B is to be selected as the selected frame image XF.

Next, the DSP/CPU 3 overwrites the selected frame image XF selected in the step S611 on the panorama synthetic image XS in such a way that the selected frame image XF matches the partial image including the selected image part (step S612). That is, the selected frame image XFXP is overwritten on the panorama synthetic image XS in such a way that the partial image XP in the panorama synthetic image XS shown in FIG. 14A matches the partial image XP of the selected frame image XFXP shown in FIG. 14B.

As shown in FIG. 14B, the DSP/CPU 3 cuts out an image part having a predetermined width along the combining direction from the panorama synthetic image XS undergone the process in the step S612, and records the cutout image part as a final panorama synthetic image XE2 in the memory card 13 (step S613).

Therefore, according to the embodiment, unlike the foregoing fifth embodiment, the selected frame image XF is precisely matched and overwritten on the panorama synthetic image XS by a simple process without executing a process of calculating a characteristic amount and searching a block BL having a common characteristic amount in a synthetic image.

Needless to say, like the fifth embodiment, because the user can select a frame image at leisure after finishing panorama image pickup, a panorama synthetic image having a portion intended by the user can be further surely obtained without forming a joint line due to image synthesizing thereon.

Image parts at the central portions having no distortion can be extracted and combined together without extracting a part having distortions at both sides in images imaged by the optical system by performing image-piece synthesizing of extracting partial images XP and combining them with the central line C taken as the reference. On the other hand, a panorama synthetic image should have plural unavoidable joint lines. However, according to the embodiment, the panorama synthetic image XS2 includes the undivided frame image XF, so that the number of joint lines can be reduced.

Therefore, a panorama synthetic image having no joint line at a part where the user intends, and having no distortion at portions other than the selected frame image XF can be acquired by image-piece synthesizing.

Although a partial image to be synthesized is extracted with the central line C passing through the central point of a frame taken as the reference in the embodiment, the reference line is not limited to the central line C, and may be a line located at a portion slightly shifted in the horizontal direction as long as it is located near the center. In particular, in a case where a direction at which the user moves the electronic camera 1 is set beforehand and a partial image is extracted within a current frame image based on a moving vector searched in a next frame using the characteristic amount in the current frame image, it is desirable that the reference line should be set beforehand at a position shifted in a direction opposite to the moving direction of the electronic camera 1. That is, in a case where a partial image is extracted from a current frame image, a partial image XP is extracted in a direction opposite to the moving vector (moving direction of the electronic camera 1) with the central line C taken as the reference. Thus, when the reference line is set beforehand at a position shifted in the direction opposite to the moving direction of the electronic camera 1, a partial image including the central area of the frame image can be extracted. Note that the direction at which the user moves the electronic camera 1 may be preset arbitrarily through the key input unit 7.

Although a partial image to be synthesized is extracted from a current frame image X in the embodiment, it may be extracted from a next frame image X+1 at the foregoing extraction width. In a case where a partial image is extracted from the next frame image X+1 at the foregoing extraction width, an image is extracted from the next frame image X+1 with a predetermined central line of the next frame image X+1 taken as the reference by the foregoing extraction width, and at this time, a partial image XP of an image corresponding to the foregoing extraction width W is extracted in a direction (left in this case) opposite to the moving direction of the electronic camera 1, i.e., the direction of the moving vector from the central line C in the next frame image X+1. In particular, in a case where a direction at which the user moves the electronic camera 1 is set beforehand, it is preferable that the reference line should be set beforehand at a position shifted in the moving direction of the electronic camera 1. That is, in a case where a partial image is extracted from a next frame image, a partial image XP is extracted in the direction of the moving vector (direction opposite to the moving direction of the electronic camera 1) with the central line C taken as the reference, so that when the reference line is set beforehand at a position shifted in the moving direction of the electronic camera 1, a partial image including the central area of the frame image can be extracted. Note that the direction at which the user moves the electronic camera 1 may be preset arbitrarily through the key input unit 7.

Although the explanation has been given of a case where a panorama synthetic image in the horizontal direction is created in the foregoing embodiments, the invention can be applied to a case where a panorama synthetic image in the vertical direction is created.

As shown in the flowcharts of FIGS. 13 and 16, the image synthesis process is started with the first frame image stored in the DRAM 10 as a target to be synthesized in the foregoing embodiments. However, calculation of a characteristic amount and calculation of a moving vector may be executed at the beginning of the image synthesis process, and if a moving vector greater than or equal to a predetermined value is calculated, the process after the step S401, the process from the step S501, or the process after the step S601 may be executed.

This makes it possible to detect whether or not the user moves the electronic camera 1, i.e., the user starts moving the electronic camera 1 while having an intension of starting panorama image pickup. Therefore, execution of a panorama image synthesis process using unnecessary images acquired before the user starts moving the electronic camera 1 with an intension of starting panorama image pickup can be avoided.

At this time, the electronic camera 1 may employ a structure of detecting which direction in vertical and horizontal direction the moving direction of the electronic camera 1 is in based on the direction of a detected moving vector greater than or equal to a predetermined value, and of performing panorama image synthesis process in accordance with the detected moving direction of the electronic camera 1. That is, for example, when the electronic camera 1 is moved leftward or rightward, a panorama synthetic image in the horizontal direction is created, and when the electronic camera 1 is moved in the upward or downward direction, a panorama synthetic image in the vertical direction is created.

As shown in the flowcharts of FIGS. 13 and 16, the image synthesis process is terminated at a time when a second frame image from the last is selected in the foregoing embodiments. However, a moving vector detected at first may be stored, and when a moving vector having a different direction (e.g., opposite direction) from the stored moving vector is detected, the image synthesis process may be terminated.

According to this scheme, panorama image pickup can be substantively terminated by a simple operation of moving the electronic camera 1, which has been moved to perform pan-orama image pickup, in a direction different from the moving direction without an operation of the panorama-image-pickup end key explained at the step S116 and an operation of releasing the shutter key explained at the step S124.

Further, the image pickup process is executed, a plurality of frame images is stored in the DRAM 10, and then the image synthesis process is executed in the foregoing embodiments. However, every time a frame image is acquired through the image pickup process, the image synthesis process may be executed successively, and then a selected frame image XF may be overwritten.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application Nos. 2006-353575 filed on Dec. 28, 2006 and 2007-007543 filed on Jan. 17, 2007, and including specification, claims, drawings and summary. The disclosures of the above Japanese Patent Applications are incorporated herein by reference in their entireties.

FIG. 1
6 DISPLAY DEVICE
8 CLOCK UNIT
9 ADDRESS DATA BUS
11 INTERNAL FLASH MEMORY
12 CARD I/F
13 MEMORY CARD
FIG. 2
START
S1 IMAGE PICKUP PROCESS
S2 IMAGE SYNTHESIS PROCESS
END
FIG. 3
IMAGE PICKUP PROCESS
S101 START DISPLAYING THROUGH IMAGE
S102 SHUTTER PRESSED?
S103 IMAGE PICKUP AND STORING
S104 PRESSING RELEASED?
S105 PREDETERMINED TIME (1/16 SECOND) ELAPSED?
RETURN
FIG. 4
IMAGE SYNTHESIS PROCESS
S201 SELECT FRAME IMAGE
S202 CALCULATE CHARACTERISTIC AMOUNT
S203 SEARCH IN NEXT FRAME BASED ON CHARACTERISTIC AMOUNT
S204 CALCULATE MOVING VECTOR
S205 SET EXTRACTION WIDTH
S206 EXTRACT PARTIAL IMAGE FROM CENTRAL LINE OF CURRENT FRAME IMAGE
S207 SYNTHESIZE EXTRACTED PARTIAL IMAGE WITH SYNTHETIC IMAGE
S208 FRAME IMAGE AT LAST-1?
S209 CUTTING OUT AND STORING
RETURN
FIG. 6C
EXTRACTION WIDTH
 MOVING VECTOR COMPONENT IN MOVING DIRECTION

FIG. 8A
FOURTH PRIORITY ORDER
  THIRD PRIORITY ORDER
    SECOND PRIORITY ORDER
      FIRST PRIORITY ORDER CENTRAL AREA
        PREVIOUS FRAME DATA A
FIG. 8B
PREVIOUS FRAME
  FIRST PRIORITY ORDER CENTRAL AREA
    SECOND PRIORITY ORDER
      THIRD PRIORITY ORDER
        FOURTH PRIORITY ORDER DATA B
FIG. 9
IMAGE SYNTHESIS PROCESS
S301 SELECT FRAME IMAGE
S302 CALCULATE CHARACTERISTIC AMOUNT BASED ON PRIORITY ORDER
S303 CHARACTERISTIC AMOUNT CALCULATED AT ANY AREA?
S304 UPDATED MOVING VECTOR PRESENT?
S305 SEARCH IN NEXT FRAME IMAGE BASED ON CHARACTERISTIC AMOUNT
S306 CALCULATE MOVING VECTOR
S307 SET EXTRACTION WIDTH
S308 EXTRACT PARTIAL IMAGE FROM CENTRAL LINE OF CURRENT FRAME
S309 SYNTHESIZE EXTRACTED PARTIAL IMAGE WITH SYNTHETIC IMAGE
S310 FRAME IMAGE AT LAST−1?
S311 SEARCH IN NEXT FRAME BASED ON CHARACTERISTIC AMOUNT CALCULATED AT LAST
S312 CALCULATE MOVING VECTOR
S313 UPDATE AND STORE MOVING VECTOR
S314 READ OUT MOVING VECTOR
S315 SET EXTRACTION WIDTH
S316 EXTRACT PARTIAL IMAGE FROM CENTRAL LINE OF FRAME IMAGE WHERE PARTIAL IMAGE IS EXTRACTED AT LAST
S317 SYNTHESIZE EXTRACTED PARTIAL IMAGE WITH PARTIAL IMAGE OF SYNTHETIC IMAGE SYNTHESIZED AT LAST IN OVERWRITING MANNER
S318 CUTTING OUT AND STORING
RETURN
FIG. 12
IMAGE PICKUP PROCESS
S111 START DISPLAYING THROUGH IMAGE
S112 PANORAMA-IMAGE-PICKUP START KEY?
S113 IMAGE PICKUP AND STORING
S114 SHUTTER KEY?
S115 ADD SELECTION IDENTIFIER
S116 PANORAMA-IMAGE-PICKUP-END KEY?
S117 PREDETERMINED TIME (1/16 SECOND) ELAPSED?
RETURN
FIG. 13
IMAGE SYNTHESIS PROCESS
S401 SELECT FRAME IMAGE
S402 CALCULATE CHARACTERISTIC AMOUNT
S403 SEARCH IN NEXT FRAME BASED ON CHARACTERISTIC AMOUNT
S404 CALCULATE MOVING VECTOR
S405 SET EXTRACTION WIDTH
S406 EXTRACT PARTIAL IMAGE FROM CENTRAL LINE OF CURRENT FRAME IMAGE
S407 SYNTHESIZE EXTRACTED PARTIAL IMAGE WITH SYNTHETIC IMAGE
S408 FRAME IMAGE AT LAST−1 ?
S409 SELECTION IDENTIFIER PRESENT?
S410 CALCULATE CHARACTERISTIC AMOUNT OF SELECTED FRAME IMAGE
S411 SEARCH IN SYNTHETIC IMAGE BASED ON CHARACTERISTIC AMOUNT
S412 SYNTHESIZE CHARACTERISTIC PART TO OVERWRITE SELECTED FRAME IMAGE
S413 CUTTING OUT AND STORING
RETURN
FIG. 15
S121 START DISPLAYING THROUGH IMAGE
S122 SHUTTER KEY (FIRST TIME)?
S123 IMAGE PICKUP AND STORING
S124 SHUTTER KEY (SECOND TIME)?
S125 ADD SELECTION IDENTIFIER
S126 PREDETERMINED NUMBER OF IMAGES?
S127 PREDETERMINED TIME (1/16 SECOND) ELAPSED?
RETURN
FIG. 16
IMAGE SYNTHESIS PROCESS
S501 SELECT FRAME IMAGE
S502 CALCULATE CHARACTERISTIC AMOUNT
S503 SEARCH IN NEXT FRAME BASED ON CHARACTERISTIC AMOUNT
S504 CALCULATE MOVING VECTOR
S505 SET EXTRACTION WIDTH
S506 EXTRACT PARTIAL IMAGE FROM CENTRAL LINE OF CURRENT FRAME
S507 SYNTHESIZE EXTRACTED PARTIAL IMAGE WITH SYNTHETIC IMAGE
S508 FRAME IMAGE AT LAST−1?
S509 DISPLAY SYNTHETIC IMAGE
S510 SPECIFIED?
S511 SELECT FRAME IMAGE INCLUDING SPECIFIED IMAGE PART
S512 CALCULATE CHARACTERISTIC AMOUNT OF SELECTED FRAME IMAGE
S513 SEARCH IN SYNTHETIC IMAGE BASED ON CHARACTERISTIC AMOUNT
S514 SYNTHESIZE CHARACTERISTIC PART TO OVERWRITE SELECTED FRAME IMAGE
S515 CUTTING OUT AND STORING
RETURN
FIG. 17
IMAGE SYNTHESIS PROCESS
S601 SELECT FRAME IMAGE
S602 CALCULATE CHARACTERISTIC AMOUNT
S603 SEARCH IN NEXT FRAME IMAGE BASED ON CHARACTERISTIC AMOUNT
S604 CALCULATE MOVING VECTOR
S605 SET EXTRACTION WIDTH
S606 EXTRACT PARTIAL IMAGE FROM CENTRAL LINE OF CURRENT FRAME
S607 SYNTHESIZE EXTRACTED PARTIAL IMAGE WITH SYNTHETIC IMAGE
S608 FRAME IMAGE AT LAST−1?
S609 DISPLAY SYNTHETIC IMAGE
S610 SPECIFIED?
S611 SELECT FRAME IMAGE FROM WHICH PARTIAL IMAGE INCLUDING SPECIFIED IMAGE PART IS EXTRACTED
S612 SYNTHESIZE FRAME IMAGE WITH PARTIAL IMAGE IN OVERWRITING MANNER
S613 CUTTING OUT AND STORING
RETURN

What is claimed is:

1. An image synthesis device comprising:
a computer processor having a memory device storing a computer program which when executed by the processor causes the processor to act as:
an image acquisition unit which performs image pickup to successively acquire a plurality of frame images;
a characteristic amount calculation unit which calculates a characteristic amount for each of plural image areas on one frame image acquired by the image acquisition unit;
an image area extraction unit which extracts an image area having a characteristic amount that is calculated by the characteristic amount calculation unit and is larger than or equal to a predetermined value;
an image area searching unit which searches an image area from an other frame image acquired by the image acquisition unit before or after the one frame image based on the characteristic amount of that image area extracted by the image area extraction unit;
a moving vector calculation unit which calculates a moving vector in the one frame image and the other frame image based on the image area searched by the image area searching unit and the image area extracted by the image area extraction unit;
a cutout width setting unit which sets a cutout width that is a distance between a predetermined reference line image and an estimated line in the one frame based on the moving vector calculated by the moving vector calculation unit, the estimated line being a line on the one frame image corresponding to the predetermined reference line in the other frame image;
an image cutout unit which cuts out a partial image, which has the cutout width in an opposite direction of the moving vector from the predetermined reference line, from the one frame image, or cuts out a partial image, which has the cutout width in a direction of the moving vector from the predetermined reference line, from the other frame image; and
an image synthesis unit which causes the characteristic amount calculation unit, the image area extraction unit, the image area searching unit, the moving vector calculation unit, the cutout width setting unit, and the image cutout unit to process the plurality of frame images successively acquired by the image acquisition unit to acquire a plurality of partial images, and successively combines and synthesis the plurality of acquired partial images in a manner that reference lines correspond to respective estimated lines.

2. The image synthesis device according to claim 1, wherein the computer program further causes the processor to act as:
a characteristic amount memory unit which successively stores image areas successively extracted by the image area extraction unit in association with respective characteristic amounts, and wherein
when there is no characteristic amount for each of plural image areas which is calculated by the characteristic amount calculation unit and which is larger than or equal to a predetermined value, the image area searching unit searches an image area stored in the characteristic amount memory unit from the other frame image, and the moving vector calculation unit calculates a moving vector of the image area stored in the characteristic amount memory unit.

3. The image synthesis device according to claim 1, wherein:
the image area searching unit searches an image area from a frame image acquired before or after the other frame image by the image acquisition unit when that image area extracted by the image area extraction unit is not present in the other frame image.

4. The image synthesis device according to claim 1, wherein the reference line is set near a central portion of a frame image.

5. The image synthesis device according to claim 1, wherein the computer program further causes the processor to act as:
a priority order setting unit which sets a priority order for each of plural image areas that the characteristic amount calculation unit calculates a characteristic amount, and wherein:
the characteristic amount calculation unit calculates a characteristic amount for each image area in an order of higher priority set by the priority order setting unit; and
the image area extraction unit extracts an image area having a characteristic amount which is calculated by the characteristic amount calculation unit at first and is larger than or equal to a predetermined value.

6. The image synthesis device according to claim 1, wherein the computer program further causes the processor to act as: a start operation controller which causes the cutout width setting unit, the image cutout unit and the image synthesis unit to start processing when the moving vector calculation unit calculates a first moving vector.

7. The image synthesis device according to claim 1, wherein the computer program further causes the processor to act as:
a moving vector memory unit which stores a moving vector calculated by the moving vector calculation unit at first; and
a termination operation controller which causes the cutout width setting unit, the image cutout unit, and the image synthesis unit to terminate a process when a moving vector calculated by the moving vector calculation unit has a direction different from a direction of the first moving vector stored in the moving vector memory unit.

8. The image synthesis device according to claim 1, wherein the computer program further causes the processor to act as:
an image selection unit which selects a frame image from a plurality of frame images acquired by the image acquisition unit; and
an overwriting synthesis unit which synthesis the frame image selected by the image selection unit on a corresponding part of a synthetic image synthesized by the image synthesis unit in an overwriting manner.

9. The image synthesis device according to claim 1, wherein the characteristic amount calculation unit calculates a characteristic amount for each of plural image areas near a center in the one frame image.

10. The image synthesis device according to claim 1, wherein a synthetic image synthesized by the image synthesis unit is a panorama image having a long side along the moving vector.

11. An image synthesis method comprising:
an image acquisition step of performing image pickup to successively acquire a plurality of frame images;
a characteristic amount calculation step of calculating a characteristic amount for each of plural image areas on one frame image acquired in the image acquisition step;
an image area extraction step of extracting an image area having a characteristic amount that is calculated in the characteristic amount calculation step and is larger than or equal to a predetermined value;

an image area searching step of searching an image area from an other frame image acquired in the image acquisition step before or after the one frame image based on the characteristic amount of that image area extracted in the image area extraction step;

a moving vector calculation step of calculating a moving vector in the one frame image and the other frame image based on the image area searched in the image area searching step and the image area extracted in the image area extraction step;

a cutout width setting step of setting a cutout width that is a distance between a predetermined reference line and an estimated line in the one frame image based on the moving vector calculated in the moving vector calculation step, the estimated line being a line on the one frame image corresponding to the predetermined reference line in the other frame image;

an image cutout step of cutting out a partial image, which has the cutout width in an opposite direction of the moving vector from the predetermined reference line, from the one frame image, or cutting out a partial image, which has the cutout width in a direction of the moving vector from the predetermined reference line, from the other frame image; and an image synthesis step of causing the characteristic amount calculation step, the image area extraction step, the image area searching step, the moving vector calculation step, the cutout width setting step, and the image cutout step to process the plurality of frame images successively acquired in the image acquisition step to acquire a plurality of partial images, and successively combining and synthesizing the plurality of acquired partial images in a manner that reference lines correspond to respective estimated lines.

12. The image synthesis method according to claim 11, further comprising:

a characteristic amount memory step of successively storing image areas successively extracted in the image area extraction step in association with respective characteristic amounts, and wherein when there is no characteristic amount for each of plural image areas which is calculated in the characteristic amount calculation step and which is larger than or equal to a predetermined value, an image area stored in the characteristic amount memory step is searched from the other frame image in the image area searching step, and a moving vector of the image area stored in the characteristic amount memory step is calculated in the moving vector calculation step.

13. The image synthesis method according to claim 11, wherein:

in the image area searching step, an image area is searched from a frame image acquired before or after the other frame image in the image acquisition step when that image area extracted in the image area extraction step is not present in the other frame image.

14. The image synthesis method according to claim 11, wherein the reference line is set near a central portion of a frame image.

15. The image synthesis method according to claim 11, further comprising:

a priority order setting step of setting a priority order for each of plural image areas that a characteristic amount is calculated in the characteristic amount calculation step, and wherein:

in the characteristic amount calculation step, a characteristic amount is calculated for each image area in an order of higher priority set in the priority order setting step; and in the image area extraction step, an image area having a characteristic amount, which is calculated in the characteristic amount calculation step at first and is larger than or equal to a predetermined value, is extracted.

16. The image synthesis method according to claim 11, further comprising a start operation control step of causing the cutout width setting step, the image cutout step and the image synthesis step to start processing when a first moving vector is calculated in the moving vector calculation step.

17. The image synthesis method according to claim 11, further comprising:

a moving vector memory step of storing a moving vector calculated in the moving vector calculation step at first; and a termination operation control step of causing the cutout width setting step, the image cutout step, and the image synthesis step to terminate a process when a moving vector calculated in the moving vector calculation step has a direction different from a direction of the first moving vector stored in the moving vector memory step.

18. The image synthesis method according to claim 11, further comprising:

an image selection step of selecting a frame image from a plurality of frame images acquired in the image acquisition step; and an overwriting synthesis step of synthesizing the frame image selected in the image selection step on a corresponding part of a synthetic image synthesized in the image synthesis step in an overwriting manner.

19. The image synthesis method according to claim 11, wherein in the characteristic amount calculation step, a characteristic amount for each of plural image areas near a center in the one frame image is calculated.

20. The image synthesis method according to claim 11, wherein a synthetic image synthesized in the image synthesis step is a panorama image having a long side along the moving vector.

21. A non-transitory computer readable medium storing an image synthesis program which allows a computer having an image acquisition unit that performs image pickup to successively acquire a plurality of frame images to function as;

a characteristic amount calculation unit which calculates a characteristic amount for each of plural image areas on one frame image acquired by the image acquisition unit;

an image area extraction unit which extracts an image area having a characteristic amount that is calculated by the characteristic amount calculation unit and is larger than or equal to a predetermined value;

an image area searching unit which searches an image area from an other frame image acquired by the image acquisition unit before or after the one frame image based on the characteristic amount of that image area extracted by the image area extraction unit;

a moving vector calculation unit which calculates a moving vector in the one frame image and the other frame image based on the image area searched by the image area searching unit and the image area extracted by the image area extraction unit;

a cutout width setting unit which sets a cutout width that is a distance between a predetermined reference line and an estimated line in the one frame image based on the moving vector calculated by the moving vector calculation unit, the estimated line being a line on the one frame image corresponding to the predetermined reference line in the other frame image;

an image cutout unit which cuts out a partial image, which has the cutout width in an opposite direction of the moving vector from the predetermined reference line, from the one frame image, or cuts out a partial image, which has the cutout width in a direction of the moving vector from the predetermined reference line, from the other frame image; and an image synthesis unit which causes the characteristic amount calculation unit, the image area extraction unit, the image area searching unit, the moving vector calculation unit, the cutout width setting unit, and the image cutout unit to process the plurality of frame images successively acquired by the image acquisition unit to acquire a plurality of partial images, and successively combines and synthesis the plurality of acquired partial images in a manner that reference lines correspond to respective estimated lines.

22. The memory medium according to claim 21 storing the image synthesis program further allows the computer to function as:

a characteristic amount memory unit which successively stores image areas successively extracted by the image area extraction unit in association with respective characteristic amounts, and wherein when there is no characteristic amount for each of plural image areas which is calculated by the characteristic amount calculation unit and which is larger than or equal to a predetermined value, the image area searching unit searches an image area stored in the characteristic amount memory unit from the other frame image, and the moving vector calculation unit calculates a moving vector of the image area stored in the characteristic amount memory unit.

23. The memory medium according to claim 21 storing the image synthesis program, wherein:

the image area searching unit searches an image area from a frame image acquired before or after the other frame image by the image acquisition unit when that image area extracted by the image area extraction unit is not present in the other frame image.

24. The memory medium according to claim 21 storing the image synthesis program which further allows the computer to function as:

a moving vector memory unit which stores a moving vector calculated by the moving vector calculation unit at first; and a termination operation controller which causes the cutout width setting unit, the image cutout unit, and the image synthesis unit to terminate a process when a moving vector calculated by the moving vector calculation unit has a direction different from a direction of the first moving vector stored in the moving vector memory unit.

25. The memory medium according to claim 21 storing the image synthesis program which further allows the computer to function as:

an image selection unit which selects a frame image from a plurality of frame images acquired by the image acquisition unit; and an overwriting synthesis unit which synthesis the frame image selected by the image selection unit on a corresponding part of a synthetic image synthesized by the image synthesis unit in an overwriting manner.

* * * * *

UNITED STATES PATENT AND TRADEMARK OFFICE
CERTIFICATE OF CORRECTION

PATENT NO. : 8,107,769 B2
APPLICATION NO. : 12/005251
DATED : January 31, 2012
INVENTOR(S) : Hiroshi Shimizu It is certified that error appears in the above-identified patent and that said Letters Patent is hereby corrected as shown below:

On the Title Page;

Item (54) and in the Specification Column 1, Line 3 Title:

Replace "STORAGE" with --STORING--.

In the Claims;

Column 37, Line 20, Claim 22, Line 1:

Delete "memory medium" and insert --non-transitory computer readable medium--.

Column 38, Line 4, Claim 23, Line 1:

Delete "memory medium" and insert --non-transitory computer readable medium--.

Column 38, Line 11, Claim 24, Line 1:

Delete "memory medium" and insert --non-transitory computer readable medium--.

Column 38, Line 23, Claim 25, Line 1:

Delete "memory medium" and insert --non-transitory computer readable medium--.

Signed and Sealed this
Thirtieth Day of April, 2013

Teresa Stanek Rea
*Acting Director of the United States Patent and Trademark Office*